United States Patent
Rose

(10) Patent No.: US 12,466,071 B2
(45) Date of Patent: *Nov. 11, 2025

(54) ROBOTS, TELE-OPERATION SYSTEMS, AND METHODS OF OPERATING THE SAME

(71) Applicant: Sanctuary Cognitive Systems Corporation, Vancouver (CA)

(72) Inventor: Geordie Rose, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 362 days.

This patent is subject to a terminal disclaimer.

(21) Appl. No.: 17/737,075

(22) Filed: May 5, 2022

(65) Prior Publication Data

US 2022/0355487 A1 Nov. 10, 2022

Related U.S. Application Data

(60) Provisional application No. 63/184,268, filed on May 5, 2021.

(51) Int. Cl.
*B25J 9/16* (2006.01)

(52) U.S. Cl.
CPC ................... *B25J 9/1689* (2013.01)

(58) Field of Classification Search
CPC ......... B25J 9/1689; G05B 2219/40134; G05B 2219/40146; G05B 2219/40414
See application file for complete search history.

(56) References Cited

U.S. PATENT DOCUMENTS

| | | | | |
|---|---|---|---|---|
| 9,050,723 | B1 * | 6/2015 | Elazary | B25J 9/163 |
| 9,457,468 | B1 * | 10/2016 | Elazary | B25J 9/161 |
| 11,279,036 | B2 * | 3/2022 | Thackston | B25J 9/1689 |
| 11,921,492 | B2 * | 3/2024 | van Baar | B25J 9/163 |

(Continued)

FOREIGN PATENT DOCUMENTS

| | | | | |
|---|---|---|---|---|
| KR | 20090001172 A | * | 1/2009 | ............ B25J 9/161 |
| KR | 101402090 B1 | * | 6/2014 | ............ B25J 13/06 |

(Continued)

OTHER PUBLICATIONS

KR-101402090-B1 translation (Year: 2014).*

(Continued)

*Primary Examiner* — Kyle T Johnson
(74) *Attorney, Agent, or Firm* — Thomas Mahon

(57) ABSTRACT

The present disclosure describes robots and tele-operation systems where a select control paradigm is selected from a plurality of control paradigms based on an identity of an operator, role of an operator, or expected tasks to be performed by the robot. Generic robots can be operated in accordance with any of the plurality of control paradigms, such that any of said generic robots can serve a role or act as an assistant to an operator by selection of an appropriate control paradigm. Control paradigms can be operator specific, or specific to a faction or role which an operator fits in, or specific to a set of tasks to be performed by the robot. The present disclosure also describes feedback mechanisms by which a robot or tele-operator system receive operator feedback and update a control paradigm, to gradually improve the control paradigm over time.

20 Claims, 6 Drawing Sheets

(56) References Cited

U.S. PATENT DOCUMENTS

| | | | |
|---|---|---|---|
| 2016/0059412 A1* | 3/2016 | Oleynik | B25J 19/02 |
| | | | 700/250 |
| 2018/0178372 A1* | 6/2018 | Lee | G06V 40/171 |
| 2019/0134812 A1* | 5/2019 | Kim | B25J 9/1661 |
| 2019/0266514 A1* | 8/2019 | Akella | G05B 23/0254 |
| 2019/0358822 A1 | 11/2019 | Wojciechowski et al. | |
| 2020/0016756 A1* | 1/2020 | Rus | B25J 9/161 |
| 2020/0094397 A1* | 3/2020 | Young | B25J 13/08 |
| 2020/0167631 A1 | 5/2020 | Rezgui | |
| 2020/0246978 A1* | 8/2020 | Johnson | B25J 13/06 |
| 2020/0398422 A1* | 12/2020 | Yufik | B25J 9/163 |
| 2020/0411015 A1* | 12/2020 | Kim | G06V 10/764 |
| 2021/0007814 A1* | 1/2021 | Shuma | A61B 34/74 |
| 2021/0053213 A1 | 2/2021 | Lee et al. | |
| 2021/0072750 A1* | 3/2021 | Lee | G05B 19/042 |
| 2021/0107139 A1 | 4/2021 | Jamali et al. | |
| 2021/0146546 A1* | 5/2021 | Linkowski | B25J 9/1676 |
| 2022/0032451 A1* | 2/2022 | Choi | B25J 9/1697 |
| 2022/0035903 A1* | 2/2022 | Kim | B25J 9/1656 |
| 2022/0355486 A1* | 11/2022 | Rose | B25J 9/1689 |
| 2022/0355487 A1* | 11/2022 | Rose | B25J 9/1689 |
| 2024/0094745 A1* | 3/2024 | Kamiya | G05D 1/6987 |

FOREIGN PATENT DOCUMENTS

| | | | | |
|---|---|---|---|---|
| KR | 20190123706 A | | 11/2019 | |
| KR | 20220018905 A | * | 2/2022 | B25J 9/16 |
| WO | WO-2019156280 A1 | * | 8/2019 | B25J 11/001 |

OTHER PUBLICATIONS

KR-20220018905-A translation (Year: 2022).*
WO-2019156280-A1 translation (Year: 2019).*
KR-20090001172-A translation (Year: 2009).*
International Search Report, PCT/CA2022/050702, Aug. 17, 2022.

* cited by examiner

ROBOTS, TELE-OPERATION SYSTEMS, AND METHODS OF OPERATING THE SAME

TECHNICAL FIELD

The present robots, tele-operation systems, and methods generally relate to controlling operation of said robots using said methods and tele-operations systems, and particularly relate to communication, control paradigms, feedback, and training between robots and tele-operation systems.

BACKGROUND

Robots can be controlled or monitored via a tele-operation system. A tele-operation system refers to a system which can receive input from an operator, and generally communicates with the robot remotely. Exemplary tele-operation systems could include a monitoring station in a warehouse, a VR suite, or a control panel, though many different variations of tele-operation system are possible. Remote communication can be short-range, such as via RF or optical communication or over a local network, or can be long-range, such as over broad networks like the internet.

BRIEF SUMMARY

The present disclosure describes robots and tele-operation systems where a select control paradigm can be selected from a plurality of control paradigms based on an identity of an operator, role of an operator, or expected tasks to be performed by the robot. Generic robots can be operated in accordance with any of the plurality of control paradigms, such that any of said generic robots can serve a role or act as an assistant to an operator by selection of an appropriate control paradigm. Control paradigms can be operator specific, or specific to a faction or role which an operator fits in, or specific to a set of tasks to be performed by the robot. The present disclosure also describes feedback mechanisms by which a robot or tele-operator system receive operator feedback and update a control paradigm, to gradually improve the control paradigm over time.

According to a broad aspect, the present disclosure describes a method of operation of a robot, the robot comprising at least one processing unit, at least one actuatable component, and a communication interface communicatively coupled to a tele-operation system, the method comprising: receiving, by the communication interface, control selection input indicating a select control paradigm from a plurality of control paradigms; selecting and accessing, by the at least one processing unit, the select control paradigm based on the control selection input; determining, by the at least one processing unit, at least one candidate action of at least one actuatable component based on the select control paradigm; causing, by the at least one processing unit, actuation of one or more of the at least one actuatable component in accordance with one or more of the at least one candidate action; receiving, by the communication interface, feedback input on one or more of the at least one candidate action from the tele-operation system; and updating, by the at least one processing unit, the select control paradigm based on the feedback input to produce an updated control paradigm.

Receiving, by the communication interface, control selection input indicating a select control paradigm from a plurality of control paradigms may include receiving, by the communication interface, control selection input indicating the select control paradigm from the plurality of control paradigms based on at least one property selected from a group consisting of: a task to be performed by the robot; a description of a human operator of the tele-operation system; and a description of the select control paradigm.

The tele-operation system may be operable by a plurality of candidate human operators, the plurality of control paradigms including a respective control paradigm specific to each respective candidate human operator; receiving the control selection input may include receiving an identification of a particular human operator from the plurality of candidate human operators; and selecting and accessing the select control paradigm may comprise selecting the control paradigm specific to the particular human operator identified in the control selection input.

The tele-operation system may be operable by a plurality of candidate human operators; a plurality of subsets of human operators may be defined among the plurality of candidate human operators, the plurality of control paradigms may include a respective control paradigm specific to each subset of human operators; receiving, by the communication interface, control selection input indicating a select control paradigm from a plurality of control paradigms may include receiving, by the communication interface, control selection input indicating a description of a human operator of the tele-operation system; and selecting and accessing the select control paradigm may comprise selecting the control paradigm specific to a subset of human operators corresponding to the description of the human operator in the control selection input.

The robot may be operable to perform a plurality of sets of tasks; the plurality of control paradigms may include a respective control paradigm specific to each set of tasks; receiving, by the communication interface, control selection input indicating a select control paradigm from a plurality of control paradigms may include receiving, by the communication interface, control selection input indicating at least one task to be performed by the robot; and selecting and accessing the select control paradigm may comprise selecting the control paradigm specific to a set of tasks which includes the at least one task indicated in the control selection input.

The robot may further include a non-transitory processor-readable storage medium communicatively coupled to the at least one processing unit, and accessing the select control paradigm may comprise retrieving the select control paradigm from the non-transitory processor-readable storage medium by the at least one processing unit.

Accessing the select control paradigm may comprise retrieving, by the communication interface, the select control paradigm from the tele-operation system.

The method may further comprise outputting an indication of the at least one candidate action, receiving feedback input may occur before causing actuation of at least one actuatable component, and receiving feedback input may comprise receiving, from the tele-operation system, at least one instruction selected from a group consisting of: approval to proceed with one or more actions of the at least one candidate action; disapproval to proceed with the at least one candidate action; and at least one alternate action instruction indicating an alternate action to be performed instead of the at least one candidate action. Updating, by the at least processing unit, the select control paradigm based on the feedback input may comprise: increasing confidence in the one or more of the at least one candidate action if the feedback input indicates approval; decreasing confidence in the at least one candidate action if the feedback input indicates disapproval; or specifying new behavior or increasing the confidence of existing behavior in the select control paradigm which corresponds to the alternate action provided by the tele-operation system.

Receiving feedback input may occur after causing actuation of at least one actuatable component in accordance with a candidate action, and receiving feedback input may comprise receiving, from the tele-operation system, positive or negative feedback input on the actuation, and updating, by the at least one processing unit, the select control paradigm based on the feedback input may comprise: increasing confidence in the candidate action if the feedback input is positive; or decreasing confidence in the candidate action if the feedback input is negative.

The method may further comprise providing for storage, by the at least one processing unit, the updated control paradigm for subsequent access.

The robot may further include a non-transitory processor-readable storage medium communicatively coupled to the at least one processing unit, and the method may further comprise storing the updated control paradigm in the non-transitory processor-readable storage medium.

The method may further comprise transmitting, by the communication interface, the updated control paradigm to be received by the tele-operation system.

According to another broad aspect, the present disclosure describes a method of operation of at least one robot via a tele-operation system, the tele-operation system comprising at least one processing unit, at least one input device, and a communication interface communicatively coupled to the at least one robot, the method comprising: receiving, by the at least one input device, control selection input indicating a select control paradigm from a plurality of control paradigms; selecting, by the at least one processing unit, the select control paradigm from the plurality of control paradigms, based on the received control selection input; sending, by the communication interface, to be received by the at least one robot, an indication of the select control paradigm; receiving, by the at least one input device, feedback input on at least one candidate action to be performed by the at least one robot based on the select control paradigm; and determining, by the at least one processing unit, at least one update to the select control paradigm based on the feedback input.

Receiving, by the at least one input device, control selection input indicating a select control paradigm from a plurality of control paradigms may include receiving, by the at least one input device, control selection input indicating the select control paradigm from the plurality of control paradigms based on at least one property selected from a group consisting of: a task to be performed by the robot; a description of a human operator of the tele-operation system; and a description of the select control paradigm.

The tele-operation system may be operable by a plurality of candidate human operators, the plurality of control paradigms may include a respective control paradigm specific to each respective candidate human operator; receiving the control selection input may include receiving an identification of a particular human operator from the plurality of candidate human operators; and selecting the select control paradigm may comprise selecting the control paradigm specific to the particular human operator identified in the control selection input.

The tele-operation system may be operable by a plurality of candidate human operators; a plurality of subsets of human operators may be defined among the plurality of candidate human operators, the plurality of control paradigms may include a respective control paradigm specific to each subset of human operators; receiving, by the at least one input device, control selection input indicating a select control paradigm from a plurality of control paradigms may include receiving, by the at least one input device, control selection input indicating a description of a human operator of the tele-operation system; selecting the select control paradigm may comprise selecting the control paradigm specific to a subset of human operators corresponding to the description of the human operator in the control selection input.

Each control paradigm in the plurality of control paradigms may be specific to a respective set of tasks in a plurality of sets of tasks to be performed by the robot; receiving, by the at least one input device, control selection input indicating a select control paradigm from a plurality of control paradigms may include receiving, by the at least one input device, control selection input indicating at least one task to be performed by the robot; and selecting the select control paradigm may comprise selecting a control paradigm specific to a set of tasks which includes the at least one task indicated in the control selection input.

The method may further comprise receiving, by the communication interface, an indication of at least one candidate action to be performed by the at least one robot based on the select control paradigm; receiving feedback input on at least one candidate action may occur before the at least one candidate action is performed by the robot; receiving feedback input on the at least one candidate action may comprise receiving, by the at least one input device at least one feedback input selected from a group consisting of: approval to proceed with at least one candidate action; disapproval to proceed with the at least one candidate action; and at least one alternate action instruction indicating at least one alternate action to be performed instead of the at least one candidate action; and the method may further comprise sending, by the communication interface, the feedback input to be received by the at least one robot.

Determining, by the at least processing unit, at least one update to the select control paradigm based on the feedback input may comprise: increasing confidence in the at least one candidate action if the feedback input indicates approval; decreasing confidence in the at least one candidate action if the feedback input indicates disapproval; or specifying new behavior or increasing the confidence of existing behavior in the select control paradigm which corresponds to the at least one alternate action.

Receiving feedback input on the at least one candidate action may occur after a candidate action is performed by the robot, and receiving feedback input on the performed action may comprise receiving, by the at least one input device, positive or negative feedback input on the performed action; determining, by the at least processing unit, at least one update to the select control paradigm based on the feedback input may comprise: increasing confidence in the performed action if the feedback input is positive; or decreasing confidence in the performed action if the feedback input is negative.

The select control paradigm may be stored on a non-transitory processor-readable storage medium included in the tele-operation system; and sending, by the communication interface, to be received by the at least one robot, an indication of the select control paradigm may comprise: sending, by the communication interface, to be received by the at least one robot, the select control paradigm.

The select control paradigm may be stored on a non-transitory processor-readable storage medium remote from the tele-operation system; and sending, by the communication interface, to be received by the at least one robot, an indication of the select control paradigm may comprise: sending, by the communication interface, an indication of the select control paradigm without sending contents of the select control paradigm itself.

The method may further comprise providing, by the at least one processing unit, instructions to store an updated control paradigm for subsequent access based on the at least one update.

According to yet another broad aspect, the present disclosure describes a robot comprising: a body; at least one physically actuatable component mechanically coupled to the body; at least one processing unit; a communication interface communicatively coupled to a tele-operation system; at least one non-transitory processor-readable storage medium communicatively coupled to the at least one processing unit, the at least one non-transitory processor-readable storage medium storing processor-executable instructions that, when executed by the at least one processing unit, cause the robot to: receive, by the communication interface, control selection input indicating a select control paradigm from a plurality of control paradigms; select and access the select control paradigm based on the control selection input; determine at least one candidate action of the at least one actuatable component based on the select control paradigm; actuate one or more of the at least one actuatable component in accordance with one or more of the at least one candidate action; receive feedback input on one or more of the at least one candidate action from the tele-operation system; and update the select control paradigm based on the feedback input to produce an updated control paradigm.

The instructions which cause the robot to receive control selection input indicating a select control paradigm from a plurality of control paradigms may cause the robot to receive, by the communication interface, control selection input indicating the select control paradigm from the plurality of control paradigms based on at least one property selected from a group consisting of: a task to be performed by the robot; a description of a human operator of the tele-operation system; and a description of the select control paradigm.

The tele-operation system may be operable by a plurality of candidate human operators, the plurality of control paradigms including a respective control paradigm specific to each respective candidate human operator; the instructions which cause the robot to receive the control selection input may cause the robot to receive, by the communication interface, an identification of a particular human operator of the plurality of candidate human operators; and the instructions which cause the robot to select the select control paradigm may cause the robot to select, by the at least one processing unit, the control paradigm specific to the particular human operator identified in the control selection input.

The tele-operation system may be operable by a plurality of candidate human operators; a plurality of subsets of human operators may be defined among the plurality of candidate human operators, the plurality of control paradigms may include a respective control paradigm specific to each subset of human operators; the instructions which cause the robot to receive, by the communication interface, control selection input indicating a select control paradigm from a plurality of control paradigms may cause the robot to receive, by the communication interface, control selection input indicating a description of a human operator of the tele-operation system; and the instructions which cause the robot to select the select control paradigm may cause the robot to select, by the at least one processing unit, the control paradigm specific to a subset of human operators corresponding to the description of the human operator in the control selection input.

The robot may be operable to perform a plurality of sets of tasks; the plurality of control paradigms may include a respective control paradigm specific to each set of tasks; the instructions which cause the robot to receive, by the communication interface, control selection input indicating a select control paradigm from a plurality of control paradigms may cause the robot to receive, by the communication interface, control selection input indicating at least one task to be performed by the robot; and the instructions which cause the robot to select the select control paradigm may cause the robot to select, by the at least one processor, the control paradigm specific to a set of tasks which includes the at least one task indicated in the control selection input.

The instructions which cause the robot to access the select control paradigm may cause the processing unit to retrieve the select control paradigm from the non-transitory processor-readable storage medium.

The instructions which cause the robot to access the select control paradigm may cause the robot to retrieve, by the communication interface, the select control paradigm from the tele-operation system.

The instructions may further cause the robot to output, by the communication interface, an indication of the at least one candidate action, and reception of feedback input may occur before actuation of at least one actuatable component; and the instructions which cause the robot to receive feedback input may cause the robot to receive, from the tele-operation system, at least one instruction selected from a group consisting of: approval to proceed with at least one candidate action; disapproval to proceed with the at least one candidate action; and at least one alternate action instruction indicating an alternate action to be performed instead of the at least one candidate action.

The instructions which cause the robot to update, by the at least processing unit, the select control paradigm based on the feedback input may cause the at least one processing unit to: increase confidence in the at least one candidate action if the feedback input indicates approval; decrease confidence in the at least one candidate action if the feedback input indicates disapproval; or specify new behavior or increase the confidence of existing behavior in the select control paradigm which corresponds to the alternate action provided by the tele-operation system.

Reception of feedback input may occur after causing actuation of the at least one actuatable component in accordance with a candidate action; the instructions which cause the robot to receive feedback input may cause the robot to receive, from the tele-operation system by the communication interface, positive or negative feedback input on the actuation; and the instructions which cause the robot to update, by the at least one processing unit, the select control paradigm based on the feedback input may cause the robot to: increase confidence in the candidate action if the feedback input is positive; or decrease confidence in the candidate action if the feedback input is negative.

The instructions may further cause the robot to provide for storage the updated control paradigm for subsequent access.

The instructions may further cause the robot to store the updated control paradigm in the non-transitory processor-readable storage medium.

The instructions may further cause the robot to transmit, by the communication interface, the updated control paradigm to the tele-operation system.

The robot may further comprise a plurality of sensors communicatively coupled to the at least one processing unit, and the instructions may further cause the robot to: collect, by the plurality of sensors, environmental data from an environment of the robot; and transmit, by the communication interface, the environmental data to be received by the tele-operation system.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
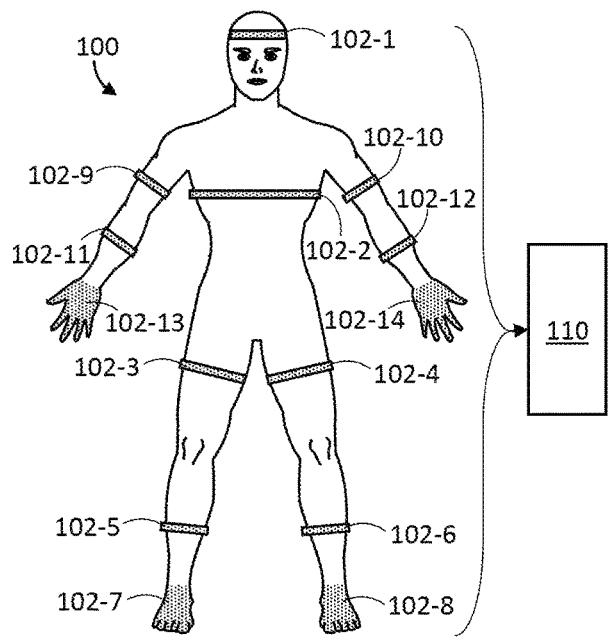
FIG. 1 is a front view of an exemplary human operator who can operate, monitor, or provide feedback or input to robots.

The following description sets forth specific details in order to illustrate and provide an understanding of the various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The various embodiments described herein provide robots, tele-operation systems, and methods generally relating to controlling operation of said robots using said methods and tele-operations systems. Control of a robot preferably leaves some decision-making in the purview of the robot, such that a human operator is not required to manually provide input for each action a robot is to perform. To achieve this, robots are provided with some form of Artificial Intelligence (AI). AI can be interpreted very broadly, and generally refers to the robot having ability to make decisions about actions to be performed. AIs can include any of (or any combination of) instructions, data, parameters, settings, algorithms, policies, models, classifiers, rules, or other aspects which enable the robot to perform some kind of decision making (these individual aspects, while possible in combination, are not each required). Alternative exemplary terms for AI can include control paradigm, control framework, or control model. When used to govern movement of a robot, an AI can also be referred to as an AI pilot. To improve a machine learning based AI, it is desirable to be able to provide instructions, feedback, or input to the AI, which allows the AI to learn and become more accurate or more specific to certain tasks over time.

FIG. 1 is a front view of an exemplary human operator 100, who can operate, monitor, or provide feedback or input to robots. In the example, operator 100 is equipped with motion sensors 102-1, 102-2, 102-3, 102-4, 102-5, 102-6, 102-7, 102-8, 102-9, 102-10, 102-11, 102-12, 102-13, and 102-14 (collectively "102"). The motion sensors 102 are equipped to the operator 100 and capture motion data for specific anatomical regions, as detailed in Table 1 later.

More or fewer motion sensors 102 could be used as appropriate for a given application. Further, although most of the sensors 102 are illustrated as being separate bands worn by the operator, other forms of sensor could be used. Examples include adhesive sensors, or a body suit which has sensors attached or embedded therein. Further, sensors 102-7, 102-8, 102-13, and 102-14 are illustrated as boots or gloves worn on the hands or feet of operator 100, and have sensors therein which capture detailed motion data of the hands and feet. However, other sensor implementations are possible, including bands or rings worn on the fingers or toes of operator 100. Motion data from sensors 102 is received by a computing unit 110. Computing unit 110 can provide input to a robot based on or including the motion data. In this way, sensors 102 and computing unit 110 act as at least part of a "tele-operator system", by which an operator can provide input or feedback to a robot.

Figure 2:
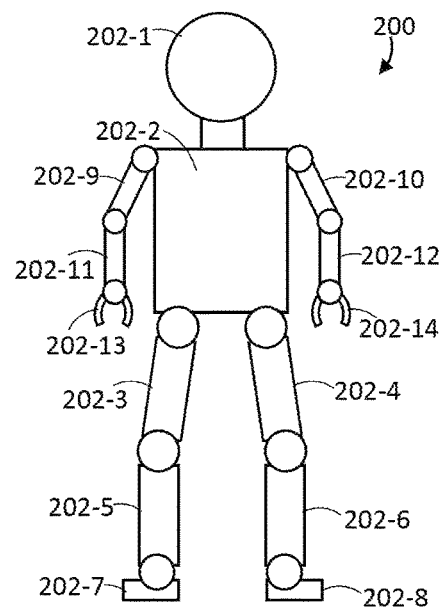
FIG. 2 is a front view of an exemplary robot which approximates human anatomy in accordance with one exemplary implementation.

FIG. 2 is a front view of an exemplary robot 200 in accordance with one implementation. In the illustrated example, robot 200 is designed to approximate human anatomy, including a number of actuatable components 202-1, 202-2, 202-3, 202-4, 202-5, 202-6, 202-7, 202-8, 202-9, 202-10, 202-11, 202-12, 202-13, and 202-14 (collectively, "202") which approximate anatomical features. More or fewer anatomical features could be included as appropriate for a given application. Further, how closely a robot approximates human anatomy can also be selected as appropriate for a given application. The tele-operation system of FIG. 1 can be used to operate, control, or provide input or feedback to the robot 200. In this example, data from each of the motion sensors 102 can be used to drive or provide instructions for causing actuation of a corresponding actuatable component 202 of robot 200. Table 1 below details the anatomy to which each sensor 102 in FIG. 1 is equipped, as well as the actuatable components 202 in FIG. 2 which correspond to said anatomy.

TABLE 1

| Anatomy | FIG. 1 Sensor | FIG. 2 Actuatable Component |
|---|---|---|
| Head | 102-1 | 202-1 |
| Torso | 102-2 | 202-2 |
| Right Thigh | 102-3 | 202-3 |
| Left Thigh | 102-4 | 202-4 |
| Right Calf | 102-5 | 202-5 |
| Left Calf | 102-6 | 202-6 |
| Right Foot | 102-7 | 202-7 |
| Left Foot | 102-8 | 202-8 |
| Right Bicep | 102-9 | 202-9 |
| Left Bicep | 102-10 | 202-10 |
| Right Forearm | 102-11 | 202-11 |
| Left Forearm | 102-12 | 202-12 |
| Right Hand | 102-13 | 202-13 |
| Left Hand | 102-14 | 202-14 |

Actuators, motors, or other movement devices can couple together actuatable components. Driving said actuators, motors, or other movement driving mechanism causes actuation of the actuatable components. For example, rigid limbs in a humanoid robot can be coupled by motorized joints, where actuation of the rigid limbs is achieved by driving movement in the motorized joints.

Figure 3:
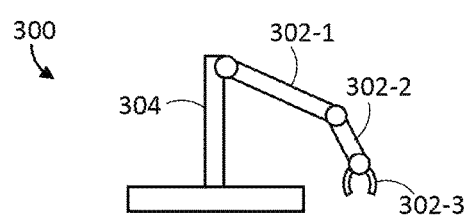
FIG. 3 is an elevated side view of a robot which approximates only a portion of human anatomy in accordance with one exemplary implementation.

Robot 200 in FIG. 2 very closely approximates human anatomy, such that input to or control of robot 200 can be provided by the operator 100 performing an action, to be replicated by the robot. In some implementations, it is possible to even more closely approximate human anatomy, such as by inclusion of actuatable components in a face on the head 202-1 of robot 200, or with more detailed design of hands 202-13 and 202-14 of robot 200, as non-limiting examples. However, in other implementations a complete approximation of the human anatomy is not required. FIG. 3 is an elevated side view of a robot 300, which approximates only a portion of human anatomy. In particular, robot 300 includes a base or stand 304, having actuatable components 302-1, 302-2, and 302-3 coupled thereto. In the example, actuatable components 302-1, 302-2, and 302-3 approximate an arm of a human. To provide input to robot 300, operator 100 could rely on the motion sensors worn on either arm. For example, motion data from sensors 102-9, 102-11, and 102-13 could be used to drive motion of actuatable components 302-1, 302-2, and 302-3, respectively. Alternatively, motion data from sensors 102-10, 102-12, and 102-14 could be used to drive motion of actuatable components 302-1, 302-2, and 302-3, respectively. When providing input to robot 300, operator 100 does not need to wear all of the motion sensors 102 illustrated in FIG. 1. FIG. 3 illustrates a robot which approximates only an arm of human anatomy; this is merely an illustrative example, and other portions of human anatomy could be approximated instead. As non-limiting examples, only a head or face could be approximated; or only a leg could be approximated.

Figure 4:
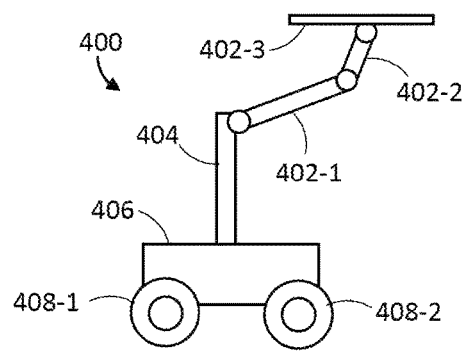
FIG. 4 is an elevated side view of a robot which does not approximate human anatomy, in accordance with one exemplary implementation.

FIGS. 2 and 3 illustrate robots which at least partially approximate human anatomy. However, this is not necessarily the case. FIG. 4 is an elevated side view of a robot 400 which does not approximate human anatomy. Robot 400 includes a body 406, having actuatable components 402-1, 402-2, and 402-3 coupled thereto via a stand 404. Body 406 has wheels 408-1 and 408-2 coupled thereto, which provide movement capabilities to the robot. Wheels 408-1 and 408-2 do not approximate human anatomy, but input can still be provided by operator 100 to drive movement of the robot 400, by abstracting the nature of the input. For example, operator 100 could walk forward, and computing unit 110 could process captured motion data to provide input to robot 400, as an input instruction for robot 400 to drive forward. Similar abstraction can occur for other movements of the robot, including turning or actuation of actuatable components 402-1, 402-2, and 402-3.

Abstraction of input is useful for all forms of tele-operation system and robot. For example, even in the case of robot 200 which closely approximates human anatomy, abstraction of input is useful for providing a simpler means of providing input or feedback. Exemplary forms of abstracted input are discussed below with reference to FIGS. 5 and 6.

Figure 5:
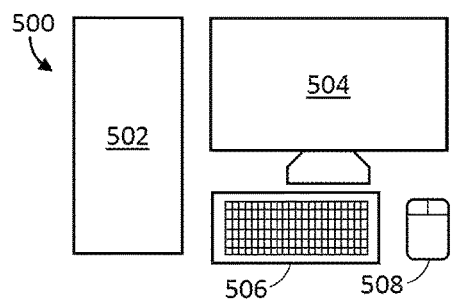
FIG. 5 is a schematic view of a computing unit which can be used to control a robot in accordance with one exemplary implementation.

FIG. 5 is a schematic view of a computing unit, including a computer 502, with a display 504, a keyboard 506, and a mouse 508 communicatively coupled thereto. An operator of computing unit 500 could for example select actions displayed on display 504 using keyboard 506 or mouse 508. As another example, a video feed from a camera of a robot could be displayed on display 504, and an operator could control movement of the robot using keyboard 506 and/or mouse 508. The specific components illustrated in FIG. 5 are exemplary, and could be removed, substituted, or supplemented as appropriate for a given application. For example, computing unit 500 could comprise an integrated laptop. As another example, display 504 could be omitted, and an operator could control a robot by looking at the robot directly. As another example, keyboard 506 and mouse 508 could be replaced or supplemented by other input devices, such as a microphone, trackpad, joystick, touchscreen, or any other appropriate input device.

Figure 6:
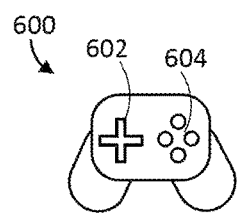
FIG. 6 is a front view of an input controller which can be used to control a robot in accordance with one exemplary implementation.

FIG. 6 is a front view of an input controller 600, which includes directional input buttons 602, and other input buttons 604. The exact buttons included could be determined as appropriate for a given application. In an example use case, a robot could be made to move in specific directions by pressing appropriate directional input buttons 602. Other actions, such as opening or closing a gripper, moving an arm, or any other appropriate actions, could be performed by pressing buttons 604.

FIGS. 5 and 6 are merely illustrative examples of certain forms of abstracted input. Other forms of abstracted input could be implemented and used as appropriate for a given application.

To develop a robot which can be operated by abstracted input, according to one implementation, the robot could first be operated using non-abstracted input, and gradually trained to operate based on abstracted input. For example, robot 200 can be operated explicitly using the tele-operation system depicted in FIG. 1, with operator 100 performing actions for duplication or emulation by robot 200. Over time, a control paradigm by which robot 200 is controlled is trained to learn motions and actions, without needing to duplicate or emulate operator 100. At this stage, abstracted forms of input can be used. For example, a control paradigm for robot 200 could learn to walk and balance by duplicating or emulating a walking motion of operator 100 in FIG. 1. This process can be reinforced by having robot 200 walk, with operator 100 only providing input when the control paradigm is failing to cause robot 200 to perform the desired motion, or when the control paradigm is uncertain how robot 200 should proceed.

In addition to or separate from a control paradigm learning to receive abstracted input, the control paradigm can learn to operate autonomously. Learning processes are detailed in FIGS. 12, 13, 14, 15, and 16 below.

Figure 7:
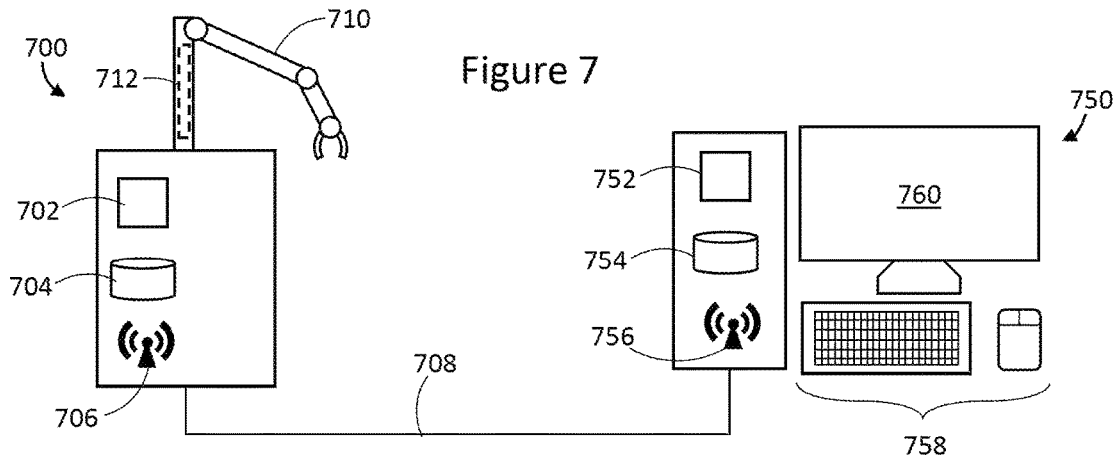
FIG. 7 is a schematic diagram illustrating components of a robot and of a tele-operator system, in accordance with one exemplary implementation.

FIG. 7 is a schematic diagram illustrating components of a robot and tele-operator system, as is pertinent to at least the methods illustrated in FIGS. 8, 12, 13, 14, 15, and 16. FIG. 7 includes a robot 700 and a tele-operator system 750.

Robot 700 is shown as including at least one processing unit 702, a non-transitory processor readable medium 704, a wireless communication interface 706, a wired communication interface 708, at least one actuatable component 710, and at least one sensor 712. However, certain components could be omitted or substituted, or elements could be added, as appropriate for a given application. For example, in implementations where a control paradigm according to which actuatable portion 710 is actuated is stored external to robot 700, robot 700 may not need non-transitory processor-readable storage medium 704 with which to store said control paradigm. As another example, in many implementations only one communication interface is needed, so robot 700 may include only one of wireless communication interface 706 or wired communication interface 708. Further, the at least one actuatable portion 710 is similar to that in robot 300 illustrated in FIG. 3. However, any appropriate structure of at least one actuatable portion could be implemented, for example robot 200 in FIG. 2, or robot 400 in FIG. 4. Further still, the at least one sensor 712 is optional. The at least one sensor 712 can include sensors which collect environmental data pertaining to the robot 700, such as an image sensor, a microphone, a temperature sensor, a humidity sensor, or any other appropriate environmental sensor. The at least one sensor 712 can include sensors which collect performance data pertaining to robot 700, such as force or torque sensors, an accelerometer, gyroscope, or any other appropriate sensors. Data from the sensors can be used to provide input for updating the control paradigm, and/or as an indication of the status or condition of robot 700 for reference by an operator of tele-operation system 750. To this end, data from the sensors 712 can be sent from robot 700 to tele-operation system 750 by communication interface 706 or 708.

Tele-operation system 750 is shown as including at least one processing unit 752, a non-transitory processor-readable medium 754, a wireless communication interface 756, a wired communication interface 708, at least one input device 758, and an output device 760. However, certain components could be omitted or substituted, or elements could be added, as appropriate for a given application. For example, in implementations where a control paradigm according to which actuatable portion 710 of robot 700 is actuated is stored on non-transitory processor-readable medium 704 of robot 700, tele-operation system 750 may not need non-transitory processor-readable storage medium 754 with which to store said control paradigm, or even the at least one processor 752. In such a case, tele-operation system 750 can receive input via the at least one input device 758 and provide this input directly to robot 700 over wireless communication interface 756 or wired communication interface 708. As yet another example, in some implementations non-transitory processor-readable storage medium 754 can be in a server, which is remote from the other components of tele-operation system 750. In such implementations, such a server may still be considered as part of tele-operation system 750. As yet another example, in many implementations only one communication interface is needed, so tele-operation system 750 may include only one of wireless communication interface 756 or wired communication interface 708. As yet another example, output device 760 can provide information to an operator of tele-operation system 750, but is not essential. For example, the operator could instead look directly at robot 700 without the need for output device 760. Additionally, output device 760 is illustrated as a display, but other output devices are possible, such as speakers, as a non-limiting example. Similarly, the at least one input device 758 is illustrated as a keyboard and mouse, but other input devices are possible, such as those discussed with reference to FIGS. 1 and 6.

In some implementations, tele-operation device 750 is portable, so that an operator can carry tele-operation device 750 with them. This enables an operator to move about an environment, yet still have access to the tele-operation system 750 for providing input to at least one robot 700. In some implementations, tele-operation device 750 is partially portable. For example, input device 758 could be portable, and the rest of tele-operation device 750 can be stationary or non-portable. Input device 758 is in communication with the rest of tele-operation device 750, such as by a wireless or wired communication interface. This enables an operator to move about an environment, yet still have access to the tele-operation system 750 for providing input to at least one robot 700, without requiring that the entire tele-operation system be portable. In some implementations, robot 700 could carry all or part of tele-operation system 750. This enables an operator to move about an environment with robot 700, and have access to the tele-operation system 750 for providing input to the robot. In other implementations, robot 700 and tele-operation system 750 are physically disconnected and separate.

Figure 8:
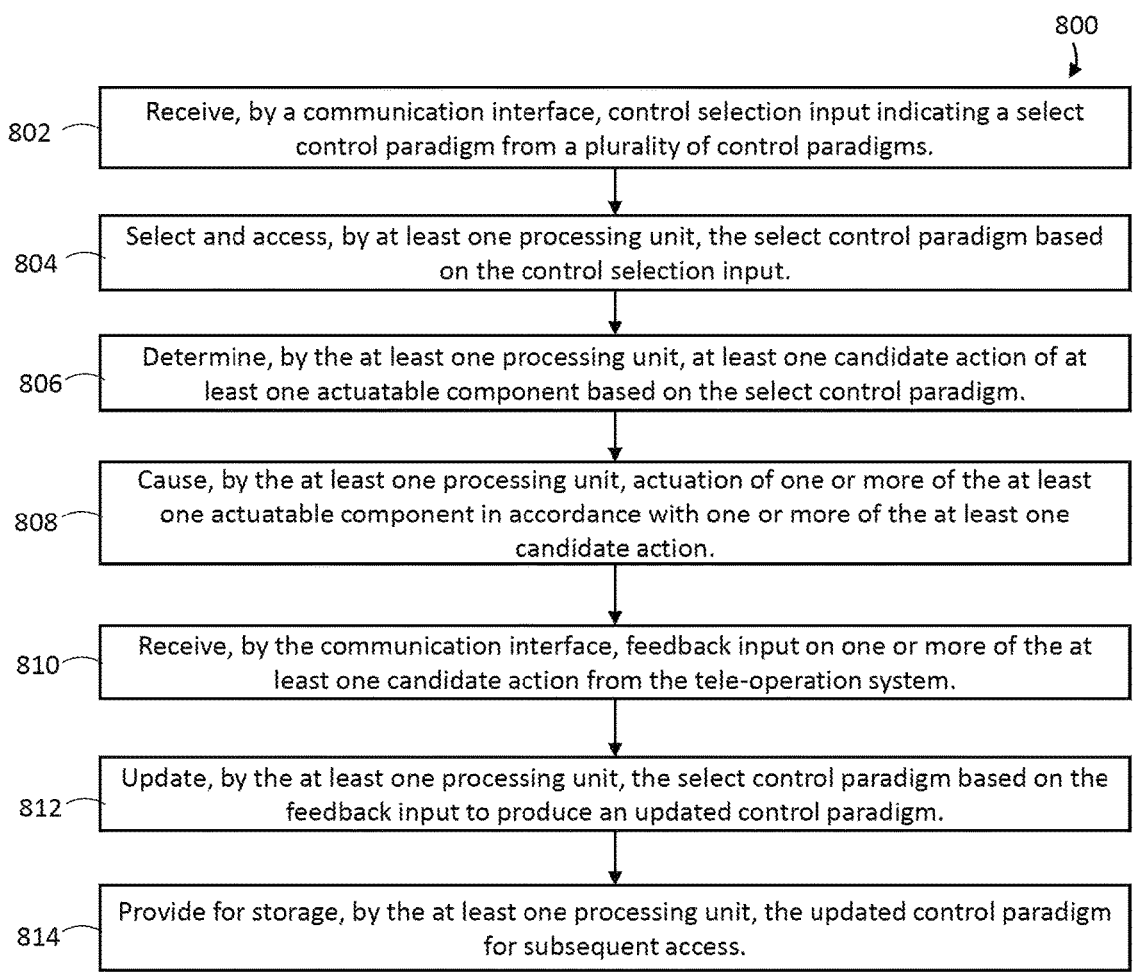
FIG. 8 is a flowchart diagram showing a method of operating a robot in accordance with one exemplary implementation.

FIG. 8 is a flowchart diagram showing an exemplary method 800 of operating a robot in accordance with the present disclosure. Method 800 as illustrated includes acts 802, 804, 806, 808, 810, 812, and 814, though those of skill in the art will appreciate that in alternative implementations certain acts may be omitted and/or additional acts may be added. Those of skill in the art will also appreciate that the illustrated order of the acts is shown for exemplary purposes only and may change in alternative implementations. For illustrative purposes, the acts of method 800 are described from the perspective of exemplary robot 700, though other robots with similar hardware could be used instead.

At 802, communication interface 706 or 708 receives control selection input indicating a select control paradigm from a plurality of control paradigms. The control selection input can indicate the select control paradigm from the plurality of control paradigms based on at least one property selected from a group consisting of: a task to be performed by the robot; a description of a human operator of the tele-operation system; and a description of the select control paradigm. Examples of control selection input are described in detail later with reference to FIGS. 9, 10A, 10B, and 11.

At 804, the at least one processing unit 702 selects and accesses the select control paradigm based on the control selection input. In some implementations, the plurality of control paradigms is stored on non-transitory processor-readable storage medium 704 of robot 700. In such implementations, accessing the select control paradigm comprises retrieving the select control paradigm from non-transitory processor-readable storage medium 704, by the at least one processing unit 702. In other implementations, the plurality of control paradigms is stored on non-transitory processor-readable medium 754 (including implementations where non-transitory processor-readable storage medium 754 is remote from the other components of tele-operation system 750). In such implementations, accessing the select control paradigm comprises retrieving the select control paradigm from non-transitory processor-readable storage medium 754, via communication interface 706 or 708. For example a copy of the select control paradigm can be moved to non-transitory processor-readable medium 704, for quick access by the at least one processing unit 702. In other examples the robot 700 can be operated directly from the select control paradigm stored in non-transitory processor-readable medium 754.

At 806, the at least one processing unit 702 determines at least one candidate action of the at least one actuatable component 710, based on the select control paradigm. For example, the select control paradigm can be an AI pilot that has been at least partially trained to have at least some autonomous capability (such as through the procedures discussed later with reference to FIGS. 12, 13, 15, and 16). Based on this autonomous capability, at least one candidate action can be determined that may be appropriate given the situation, circumstance, or environment of robot 700.

At 808, the at least one processing unit 702 causes actuation of one or more of the at least one actuatable component 710 in accordance with one or more of the at least one candidate action. In some implementations, act 808 can be performed prior to acts 810 and 812 (as is discussed in detail later with reference to FIG. 13). In other implementations, act 808 can be performed after acts 810 and 812 (as is discussed in detail later with reference to FIG. 12).

At 810, the communication unit 706 or 708 receives feedback input on one or more of the at least one candidate action from the tele-operation system 750. At 812, the at least one processing unit 702 updates the select control paradigm based on the feedback input to produce an updated control paradigm. Detailed means for receiving feedback input and updating the select control paradigm are discussed later with reference to FIGS. 12 and 13.

At 814, the at least one processing unit 702 provides for storage the updated control paradigm for subsequent access. For example, in implementations where the plurality of control paradigms is stored on the non-transitory processor-readable storage medium 704 of robot 700, the updated control paradigm is also stored on non-transitory processor-readable storage medium 704. In some examples the updated control paradigm can replace the select control paradigm in storage. In other examples the updated control paradigm can be stored in addition to the select control paradigm, so that either the updated or non-updated control paradigm can be accessed in the future. In implementations where the plurality of control paradigms is stored on non-transitory processor-readable medium 754 (including implementations where non-transitory processor-readable storage medium 754 is remote from the other components of tele-operation system 750), the updated control paradigm is transmitted by communication interface 706 or 708, to be received by tele-operation unit 750, and stored on non-transitory processor-readable storage medium 754.

In some implementations, non-transitory processor-readable storage medium 704 of robot 700 can have instructions stored thereon which, when executed by the at least one processing unit 702, cause robot 700 to perform method 800 as detailed in FIG. 8. For acts which involve causing robot 700 to receive input, such as acts 802 and 810, when implemented as instructions such instructions can cause the robot 700 to monitor for an input signal, detect an input signal, and/or process a detected input signal. This applies to similar acts of receiving input throughout this disclosure.

FIGS. 9, 10A, 10B, and 11 are schematic illustrations of selection of a control paradigm, as pertains to act 804 as shown in FIG. 8 and discussed above, and as pertains to act 1404 shown in FIG. 14 discussed later. FIGS. 9, 10A, 10B, and 11 illustrate selection of a control paradigm for controlling a robot 700, as is illustrated in FIG. 7 and described above. However, a control paradigm can be selected for any appropriate robot, including robots 200, 300, 400, or any other robot suitable for a given application.

Figure 9:
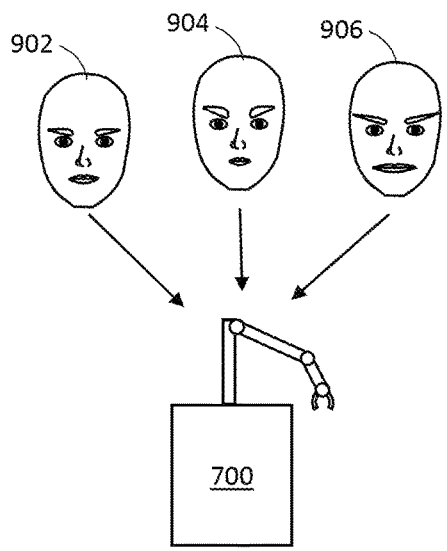
FIGS. 9, 10A, 10B, and 11 are schematic illustrations of selection of a control paradigm, according to which a robot is controlled, in accordance with three exemplary implementations.

In FIG. 9, a plurality of candidate operators 902, 904, and 906 can use, control, or operate robot 700. Although three candidate operators are illustrated, in practice fewer or more candidate operators can use robot 700, as appropriate for a given application. In this sense, to "use" a robot refers to having the robot perform a set of tasks which are helpful to an operator or required by an operator. Performing such a set of tasks could entail the robot performing tasks to fulfill a desired role autonomously or independently (apart from training feedback), or could entail the robot performing a set of sub-tasks which help the operator to perform a greater set of tasks. For example, a robot controlled according to a janitorial control paradigm could perform a set of cleaning tasks of a space, such that the space is cleaned entirely by the robot. Alternatively, a robot controlled according to a janitorial control paradigm could perform a set of sub-tasks which assist a human janitor in performing greater janitorial tasks. For example, the robot could carry tools and pass them to the janitor at appropriate times.

FIG. 9 illustrates that a single robot (or a single model of robot) 700 could be used by a plurality of different operators 902, 904, and 906 for different purposes, and controlled according to different control paradigms specific to each operator's needs. To achieve this, in the implementation of FIG. 9 the plurality of control paradigms includes a respective control paradigm specific to each respective candidate human operator 902, 904, and 906. To use robot 700, a particular operator of the candidate operators 902, 904, and 906 inputs an identification of themselves to tele-operation system 750 by input device 758. For example, the particular operator can input their name, username, identification number, and/or passcode by input device 758 (e.g. by typing with a keyboard, or speaking into a microphone). Apart from the illustrated input device, a useful input device for inputting identification could be an ID card reader, a facial recognition device, a microphone, a fingerprint reader, or any other appropriate identification verification device. The input identification acts as a control selection input indicative of a control paradigm corresponding to the identified candidate operator. Tele-operation system 750 sends this control selection input by communication interface 756 or 708, to robot 700, to be received by communication interface 706 or 708.

In some implementations, the identification of the operator is sent to robot 700. Robot 700 receives the control selection input by communication interface 706 or 708, and selects and accesses the select control paradigm which is specific to the particular operator identified in the control selection input. This entails the at least one processor 702 determining the select control paradigm which corresponds to the identity of the particular operator, and retrieving this select control paradigm from a storage location of the plurality of control paradigms (e.g., from non-transitory processor-readable medium 704, or non-transitory processor-readable medium 754).

In other implementations, the select control paradigm corresponding to the operator is determined by the at least one processor 752 of tele-operation system 750, and an indication of the select control paradigm (such as an ID number and/or storage location) is sent to robot 700. Robot 700 receives this indication of the control paradigm by communication interface 706 or 708, and retrieves this select control paradigm from a storage location of the plurality of control paradigms (e.g., from non-transitory processor-readable medium 704, or non-transitory processor-readable medium 754).

In yet other implementations, the control paradigm corresponding to the operator is determined by the at least one processor 752 of tele-operation system 750, and the control paradigm is retrieved (such as from non-transitory processor-readable medium 754) and sent to robot 700. In such an implementation, robot 700 receives the control paradigm for controlling robot 700 by communication interface 706 or 708.

Figure 10A:
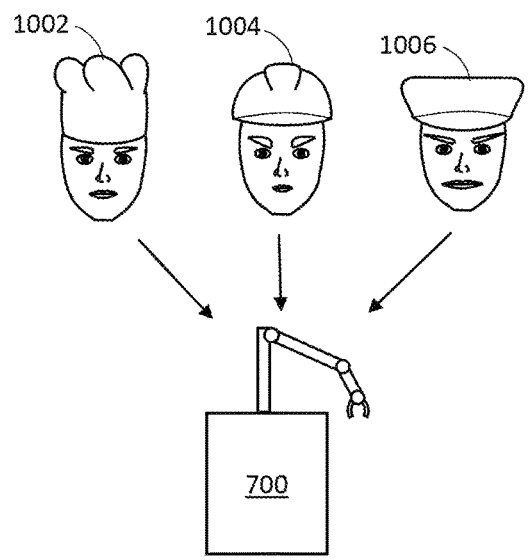

In FIG. 10A, a plurality of candidate operators can use robot 700. FIG. 10A illustrates a plurality of subsets of candidate operators 1002, 1004, and 1006. Each subset of candidate operators can include one or more candidate operators. The subsets of candidate operators are defined according to a role, vocation, faction, purpose, or set of duties to which each candidate operator is correlated. In the example of FIG. 10A, subset 1002 includes candidate operators with a culinary role or vocation (e.g., chef, food preparation, or similar); subset 1004 includes candidate operators with a construction role or vocation (e.g., construction worker, maintenance worker, or similar); and subset 1006 includes candidate operators with a security role or vocation (e.g. police officer, security guard, or similar). Although three subsets of candidate operators are illustrated, in practice fewer or more subsets of candidate operators can use robot 700, as appropriate for a given application. Further, the delineation between subsets is merely exemplary, and any appropriate delineation between subsets could be used as appropriate for a given application. Many more delineations could be added, or delineations could be simplified or reduced. Exemplary delineations could be based on geographic location, common interests, common team, common rank, common language, common culture, common cohort, or common operating style, as non-limiting examples.

Each subset of candidate operators can have different needs or tasks expected to be performed by robot 700. FIG. 10A illustrates that a single robot (or a single model of robot) 700 could be used by a plurality of different operators 1002, 1004, and 1006 for different purposes, and controlled according to different control paradigms specific to a role or vocation of a particular operator. To achieve this, in the implementation of FIG. 10A the plurality of control paradigms includes a respective control paradigm specific to each respective subset of candidate human operators 1002, 1004, and 1006. To use robot 700, a particular operator of the candidate operators inputs an identification of themselves, an identification of their role (or description of themselves), or an identification of a desired control paradigm to tele-operation system 750 by input device 758. Inputting the identification could comprise an operator selecting appropriate identification (e.g. an operator selecting a role or specific control paradigm from a menu indicating a plurality of available roles or control paradigms). This identification acts as a control selection input indicative of a control paradigm corresponding to the desired subset of candidate operators. Tele-operation system 750 sends this control selection input by communication interface 756 or 708, to robot 700, to be received by communication interface 706 or 708.

In some implementations, identification of a particular operator is sent to robot 700 as the control selection input. Robot 700 receives the control selection input by communication interface 706 or 708, and selects and accesses the select control paradigm which is specific to the subset of candidate operators to which the particular operator identified in the control selection input belongs. This entails the at least one processor 702 determining the subset of candidate operators to which the particular operator belongs, determining the select control paradigm which corresponds to the subset of candidate operators, and retrieving this select control paradigm from a storage location of the plurality of control paradigms (e.g., from non-transitory processor-readable medium 704, or non-transitory processor-readable medium 754).

In other implementations, identification of the role of a particular operator (or description of the particular operator) is sent to robot 700 as the control selection input. This could be because this is what was input by the particular operator via input device 758, or because the at least one processor 752 determined this identification of role or description from an input by an operator to input device 758 which identified the particular operator. Robot 700 receives the control selection input by communication interface 706 or 708, and selects and accesses the select control paradigm which is specific to the subset of candidate operators identified by the control selection input. This entails the at least one processor 702 determining the subset of candidate operators based on the identification of role or description of the particular operator (the description in some examples could explicitly indicate the appropriate subset of candidate operators), determining the select control paradigm which corresponds to the subset of candidate operators, and retrieving this select control paradigm from a storage location of the plurality of control paradigms (e.g., from non-transitory processor-readable medium 704, or non-transitory processor-readable medium 754).

In yet other implementations, identification of the appropriate subset of candidate operators is sent to robot 700 as the control selection input, such as in cases where the subset of candidate operators is input by the particular operator. Processor 702 then retrieves this select control paradigm from a storage location of the plurality of control paradigms (e.g., from non-transitory processor-readable medium 704, or non-transitory processor-readable medium 754).

In yet other implementations, the select control paradigm corresponding to the subset of candidate operators is determined by the at least one processor 752 of tele-operation system 750 (such as from an identity of the particular operator, an identification of the role of the particular operator, or a description of the particular operator similarly to as discussed above). An indication of the select control paradigm (such as an ID number and/or storage location) is sent to robot 700 by communication interface 756 or 708. Robot 700 receives this indication of the control paradigm by communication interface 706 or 708, and retrieves this select control paradigm from a storage location of the plurality of control paradigms (e.g., from non-transitory processor-readable medium 704, or non-transitory processor-readable medium 754).

In yet other implementations, the select control paradigm corresponding to the subset of candidate operators is determined by the at least one processor 752 of tele-operation system 750 (such as from an identity of the particular operator, an identification of the role of the particular operator, or a description of the particular operator similarly to as discussed above), and the select control paradigm is retrieved (such as from non-transitory processor-readable medium 754) and sent to robot 700 by communication interface 756 or 708. In such an implementation, robot 700 receives the select control paradigm for controlling robot 700 by communication interface 706 or 708.

Advantageously, a control paradigm common to each subset of candidate operators can be trained and learned based on use and feedback input by any one operator in a subset of candidate operators. In this way, learning between operators with similar roles can be shared, which expedites the learning process, and improves robustness of learned algorithms.

Figure 10B:
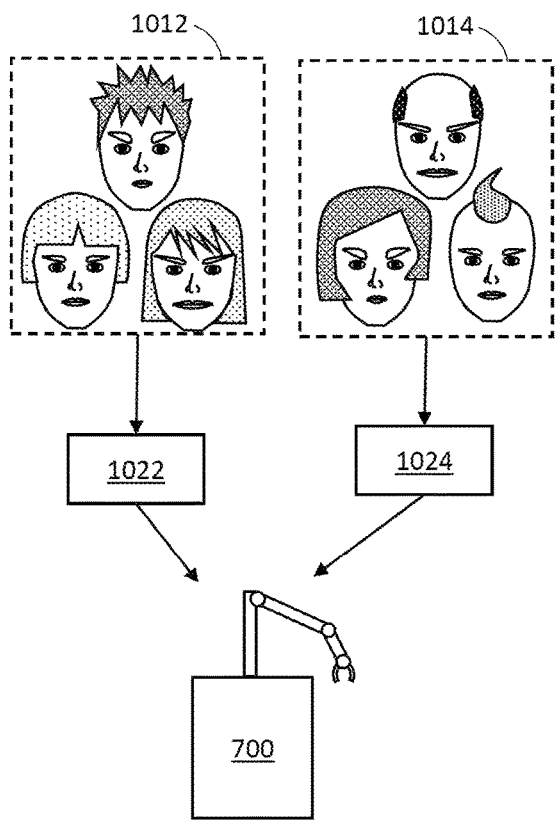

FIG. 10B illustrates a similar scenario to FIG. 10A, and the discussion of FIG. 10A applies to FIG. 10B, especially as it pertains to selection and access of a select control paradigm corresponding to a subset of candidate operators. One difference between FIG. 10A and FIG. 10B is that in FIG. 10B, individual candidate operators within subsets of candidate operators are illustrated (whereas FIG. 10A illustrates representative operators 1002, 1004, and 1006 each representing a subset of candidate operators). In FIG. 10B, a first subset of candidate operators 1012 and a second subset of candidate operators 1014 are shown. Subset 1012 includes three candidate operators, and subset 1014 includes three candidate operators, though any appropriate number of candidate operators could be included in each subset. Further, each subset can have a different number of candidate operators from another subset. Further still, more subsets of candidate operators could be included. Within each subset, the candidate operators have at least one aspect in common. For example, each candidate operator within a subset can have a common job, common set of responsibilities, common geographic location, common interests, common team, common rank, common language, common culture, common cohort, common operating style, or any other appropriate common aspect. For the candidate operators in subset 1012, robot 700 can be operated according to a control paradigm 1022. For the candidate operators in subset 1014, robot 700 can be operated according to a control paradigm 1024. Further, control paradigm 1022 can be updated based on feedback input from any of the candidate operators in subset 1012, and control paradigm 1024 can be updated based on feedback input from any of the candidate operators in subset 1014 (exemplary methods of updating a control paradigm are discussed below with reference to FIGS. 12, 13, 15, and 16). Candidate operators in subset 1012 "share" control paradigm 1022, and candidate operators in subset 1014 "share" control paradigm 1024. This sharing of a control paradigm among a plurality of candidate operators increases the training speed of the control paradigm, by providing more data for the training of the control paradigm. This sharing of a control paradigm can also result in a more robust and effective control paradigm, by providing more diverse data for training (since the data comes from a plurality of different operators with their own styles and idiosyncrasies). Further, because the candidate operators are grouped into subsets based on at least one common aspect between the candidate operators, a resulting control paradigm will be especially robust as it regards the common aspect or aspects, because the control paradigm will receive training on how to solve similar problems from different viewpoints. For example, if candidate operators are grouped into subsets such that each candidate operator in a subset has a common job or vocation, a control paradigm trained based on a given subset will be very robust at handling a job or vocation corresponding to the subset, since it will be given a diverse array of data regarding how different operators perform the same job or vocation.

Further, subsets are not required to be exclusive, and subsets can contain further subsets. For example, candidate operators could be grouped into subsets based on common language, then grouped into further subsets based on job or vocation. As another example, candidate operators could have more than one important aspect, and could be grouped into a plurality of different subsets based on each important aspect. For example, a candidate operator could have more than one vocation, and could be grouped into multiple subsets based on these multiple vocations. In such cases, a candidate operator may select an appropriate control paradigm for a given task from a plurality of control paradigms available to them.

Figure 11:
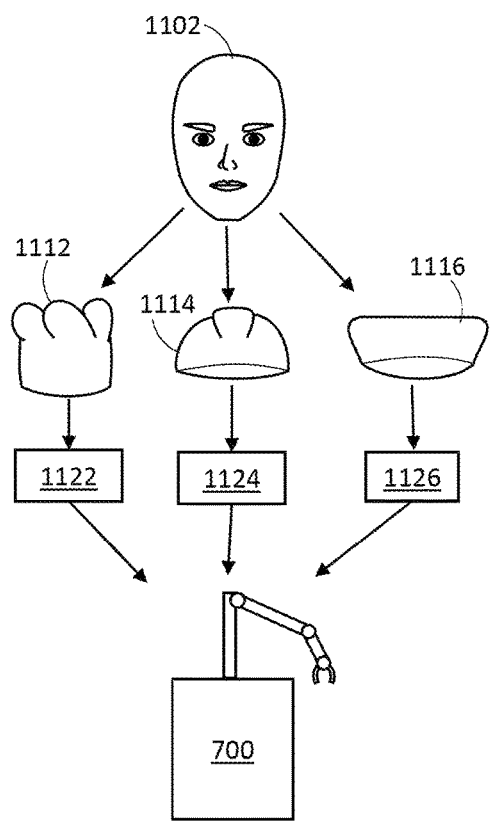

In FIG. 11, a robot 700 can be controlled based on a set of tasks or a role for which the robot 700 is responsible, regardless of who an operator of the robot 700 is or what the operator's role is. FIG. 11 illustrates an operator 1102, and a plurality of roles (or sets of tasks) 1112, 1114, and 1116 which the robot 700 is operable to perform. In the example of FIG. 11, role 1112 includes culinary tasks (e.g., chef, food preparation, or similar); role 1114 includes construction-related tasks (e.g., construction worker, maintenance worker, or similar); and role 1116 includes security-related tasks (e.g. police officer, security guard, or similar). Although three roles (sets of tasks) are illustrated, in practice robot 700 can be operated to serve fewer or more roles, as appropriate for a given application. Further, the delineation between roles is merely exemplary, and any appropriate delineation between roles could be used as appropriate for a given application. Many more delineations could be added, or delineations could be simplified or reduced.

FIG. 11 illustrates that a single robot (or a single model of robot) 700 could be controlled according to different control paradigms specific to different roles or sets of tasks specific to a situation. In particular, in the implementation of FIG. 11 the plurality of control paradigms includes control paradigms 1122, 1124, and 1126 specific to each respective role or set of tasks 1112, 1114, and 1116. To use robot 700, operator 1102 inputs an identification of the role to be performed, or an identification of a desired control paradigm to tele-operation system 750 by input device 758. This identification acts as a control selection input indicative of a control paradigm corresponding to the desired role or set of tasks. For example, as control selection input operator 1102 can input an identification of role 1112 for which control paradigm 1122 will be selected; operator 1102 can input an identification of role 1114 for which control paradigm 1124 will be selected; or operator 1102 can input an identification of role 1116 for which control paradigm 1126 will be selected. In alternative examples, operator 1102 could directly input identification of a control paradigm 1122, 1124, or 1126 for operation of robot 700 according to the selected control paradigm. Tele-operation system 750 sends this control selection input to robot 700 by communication interface 706 or 708. The role of operator 1102 does not need to match the role or set of tasks which are to be performed by robot 700 (though in some cases it can). In some examples, the role of operator 1102 can be to oversee a plurality of robots serving different roles.

In some implementations, identification of a role or set of tasks is sent to robot 700 as the control selection input. Robot 700 receives the control selection input by communication interface 706 or 708, and selects and accesses the select control paradigm which is specific to the role or set of tasks identified in the control selection input. This entails the at least one processor 702 determining the select control paradigm which corresponds to the role or set of tasks, and retrieving this select control paradigm from a storage location of the plurality of control paradigms (e.g., from non-transitory processor-readable medium 704, or non-transitory processor-readable medium 754).

In other implementations, the select control paradigm corresponding to the role or set of tasks is sent to robot 700 from tele-operation system 750. This could be because the select control paradigm is determined by the at least one processor 752 of tele-operation system 750 based on the identification of role or set of tasks similarly to as discussed above, or because the select control paradigm was indicated in the input from operator 1102. An indication of the select control paradigm (such as an ID number and/or storage location) is sent to robot 700. Robot 700 receives this indication of the control paradigm by communication interface 706 or 708, and retrieves this select control paradigm from a storage location of the plurality of control paradigms (e.g., from non-transitory processor-readable medium 704, or non-transitory processor-readable medium 754).

In yet other implementations, the select control paradigm corresponding to the role or set of tasks is determined by the at least one processor 752 of tele-operation system 750, or is identified to tele-operation system 750 in the input from operator 1102, and the select control paradigm is retrieved (such as from non-transitory processor-readable medium 754) and sent to robot 700. In such an implementation, robot 700 receives the select control paradigm for controlling robot 700 by communication interface 706 or 708.

Advantageously, providing a respective control paradigm specific to each role or set of tasks enables operation of robot 700 by an operator who is not necessarily skilled in each task, or allows an operator to oversee a plurality of robots performing different roles or sets of tasks, as non-limiting examples.

Figure 12:
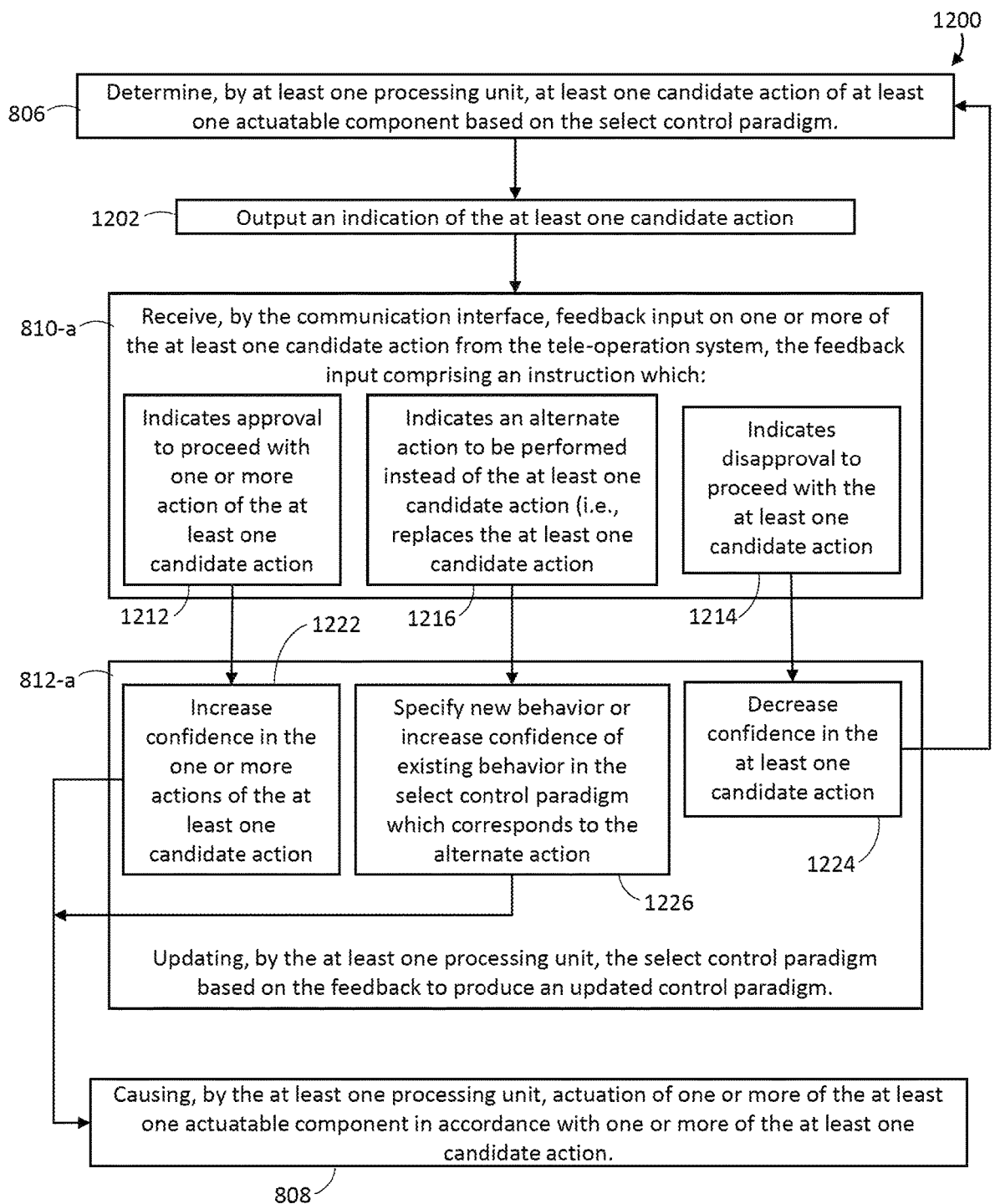
FIG. 12 is a flowchart diagram which illustrates a method for a robot receiving input on at least one candidate action to be performed by the robot, in accordance with one exemplary implementation.

FIG. 12 is a flowchart diagram of a method 1200. Method 1200 fits within method 800 described above with reference to FIG. 8, with FIG. 12 providing additional context and detail regarding an exemplary implementation of acts 806, 808, 810, and 812 in method 800 described with reference to FIG. 8. Additional acts 1202, 1222, 1224, and 1226 are described in method 1200. Further, different feedback inputs are labelled as 1212, 1214, and 1216. Additional acts could be added, acts could be reordered, or acts could be removed, as appropriate for a given application. FIG. 12 depicts an implementation where a robot determines at least one candidate action and seeks feedback input on the at least one candidate action prior to performing any candidate action. FIG. 12 illustrates acts from a perspective of a robot. A similar method described from the perspective of a tele-operator system is described with reference to FIG. 15 later. The acts of method 1200 are described below with reference to robot 700 and tele-operator system 750 as illustrated in FIG. 7, though other robots or tele-operator systems with similar hardware could also be used.

In act 806, at least one processing unit 702 of robot 700 determines at least one candidate action of at least one actuatable component 710 based on a select control paradigm, as described above with reference to FIG. 8.

In act 1202, the robot 700 outputs an indication of the at least one candidate action. The indication is transmitted by communication interface 706 or 708, to be received by communication interface 756 or 708 of tele-operation system 750, and an operator of the teleoperator system 750 inputs feedback input on one or more of the at least one candidate action by input device 758.

Act 810-*a* in method 1200 shows a specific implementation of act 810 shown in FIG. 8. In act 810-*a*, the robot 700 receives, by communication interface 706 or 708, the feedback input on the one or more of the at least one candidate action. This feedback input can be sent by communication interface 756 or 708 of tele-operation system 750. The feedback input comprises at least one instruction selected from a group consisting of: approval to proceed with one or more actions of the at least one candidate action (shown at 1212); disapproval to proceed with the at least one candidate action (shown at 1214); and at least one alternate action instruction indicating an alternate action to be performed instead of the at least one candidate action (shown at 1216). In the case of an alternate action instruction, the at least one processor of the robot can replace the at least one candidate action with the alternate action, such that subsequently performing the at least one candidate action comprises performing the alternate action.

Act 812-*a* in method 1200 shows a specific implementation of act 812 shown in FIG. 8. In act 812-*a*, the at least one processing unit 702 of the robot 700 updates the select control paradigm based on the feedback input to produce an updated control paradigm. At 1222, the at least one processor 702 increases confidence in the one or more of the at least one candidate action if the feedback input indicates approval. At 1224, the at least one processor 702 decreases confidence in the one or more of the at least one candidate action if the feedback input indicates disapproval. At 1226, the at least one processor 702 specifies new behavior or increases the confidence of existing behavior in the select control paradigm which corresponds to the alternate action. Increasing or decreasing "confidence" refers to altering the control paradigm (e.g. adjusting coefficients in a neural network or similar; applying different weights to certain actions) to change how the control paradigm will respond when faced with the same or similar situation in the future. Increasing confidence will increase the likelihood that the same at least one candidate action is determined, whereas decreasing confidence will reduce the likelihood that the same at least one candidate action is determined. In the case of specifying new behavior, the control paradigm can be modified to include a new possible at least one candidate action as a response.

In act 808, the at least one processing unit 702 causes actuation of one or more of the at least one actuatable component 710 in accordance with one or more of the at least one candidate action. This is performed when the feedback input indicates approval (as shown by the flowchart arrows from 1212, to 1222, to 808), or when the feedback input indicates an alternate action (as shown by the flowchart arrows from 1216, to 1226, to 808). If the feedback input indicates disapproval, with no indication of alternate action, the at least one processing unit 702 returns to act 806, where a new at least one candidate action is determined. In view of the update to the control paradigm in act 812-*a*, the at least one processing unit 702 should determine a different at least one candidate action (even if this takes multiple iterations) which will be approved by an operator (or until an operator provides an alternate action instruction).

Figure 13:
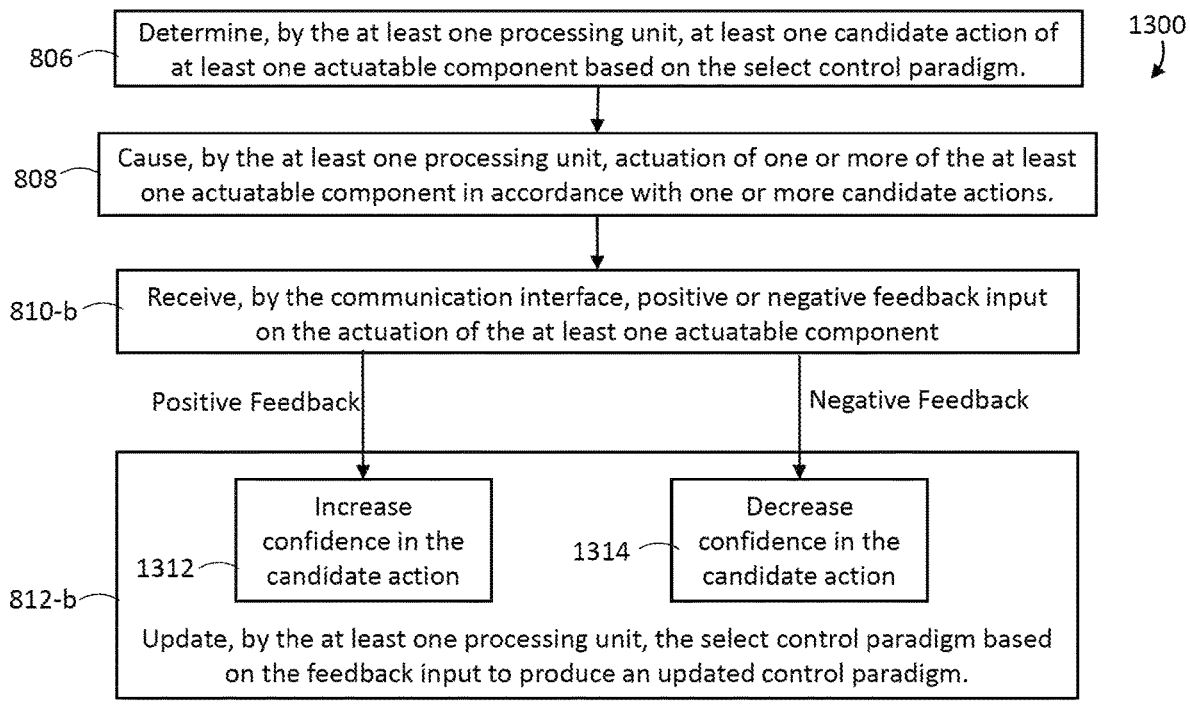
FIG. 13 is a flowchart diagram which illustrates a method for a robot receiving input on an action performed by the robot, in accordance with one exemplary implementation.

FIG. 13 is a flowchart diagram of a method 1300. Method 1300 fits within method 800 described above with reference to FIG. 8, with FIG. 13 providing additional context and detail regarding another exemplary implementation of acts 806, 808, 810, and 812 in method 800 described with reference to FIG. 8. Additional acts 1312 and 1314 are described in method 1300. Additional acts could be added, acts could be reordered, or acts could be removed, as appropriate for a given application. In essence, FIG. 13 depicts an implementation where a robot determines at least one candidate action, performs a candidate action, and receives feedback on the performed candidate action, to update a control paradigm for the future. FIG. 13 illustrates acts from a perspective of a robot. A similar method described from the perspective of a tele-operator system is described with reference to FIG. 16 below. The acts of method 1300 are described below with reference to robot 700 and tele-operator system 750 as illustrated in FIG. 7, though other robots or tele-operator systems with similar hardware could also be used.

In act 806, at least one processing unit 702 of robot 700 determines at least one candidate action of at least one actuatable component 710 based on a select control paradigm, as described above with reference to FIG. 8.

In act 808, the at least one processing unit 702 causes actuation of one or more of the at least one actuatable component 710 in accordance with one or more candidate actions (e.g. one action of the at least one candidate action, or all actions of the at least one candidate actions), as described above with reference to FIG. 8.

Act 810-*b* in method 1300 shows a specific implementation of act 810 shown in FIG. 8. In act 810-*b*, the robot 700 receives, by communication interface 706 or 708, positive or negative feedback input on the actuation of the one or more of the at least one actuatable component 710 in accordance with the candidate action. This feedback input can be received from an operator by input device 758 of tele-operation system 750, and sent to robot 700 by communication interface 756 or 708. "Positive" feedback input means the operator approves of the actuation. Alternative terms for positive could include: approving, affirmative, or reinforcing, as examples. "Negative" feedback input means the operator disapproves of the actuation. Alternative terms for negative could include: disapproving, dissenting, disagreeing, or critical, as examples.

Act 812-*b* in method 1300 shows a specific implementation of act 812 shown in FIG. 8. In act 812-*b*, the at least one processing unit 702 of the robot 700 updates the select control paradigm based on the feedback input to produce an updated control paradigm. At 1312, the at least one processor 702 increases confidence in the candidate action if the feedback input is positive. At 1314, the at least one processor decreases confidence in the candidate action if the feedback input is negative. These modifications to confidence in actions trains the control paradigm to determine more appropriate candidate actions in the future.

In some implementations, non-transitory processor-readable storage medium 704 of robot 700 can have instructions stored thereon which, when executed by the at least one processing unit 702 of the robot 700, cause the robot 700 to perform method 1200 as detailed in FIG. 12 or method 1300 as detailed in FIG. 13. For acts which involve causing robot 700 to receive input, such as acts 810-*a*, when implemented as instructions such instructions can cause the robot 700 to monitor for an input signal, detect an input signal, and/or process a detected input signal. This applies to similar acts of receiving input throughout this disclosure.

Figure 14:
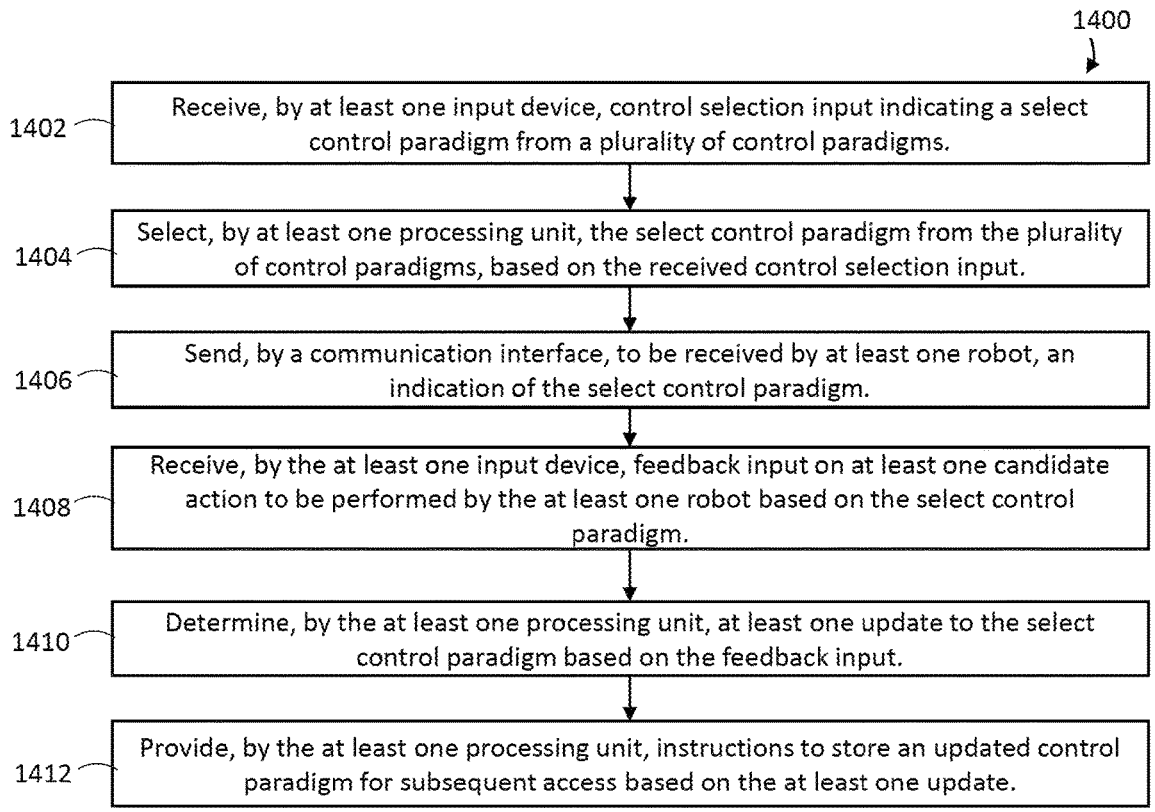
FIG. 14 is a flowchart diagram showing a method of operating a robot via a tele-operation system in accordance with one exemplary implementation.

FIG. 14 is a flowchart diagram showing an exemplary method 1400 of operation of a robot via a tele-operation system in accordance with the present disclosure. The robot operated could for example be robot 700, and the tele-operation system could be tele-operation system 750 described with reference to FIG. 7. Some reference numerals used in describing FIG. 14 refer to components in FIG. 7, though other robots or tele-operation systems could be used as appropriate for a given application. Method 1400 as illustrated includes acts 1402, 1404, 1406, 1408, 1410, and 1412, though those of skill in the art will appreciate that in alternative implementations certain acts may be omitted and/or additional acts may be added. Those of skill in the art will also appreciate that the illustrated order of the acts is shown for exemplary purposes only and may change in alternative implementations. The acts of method 1400 are described from the perspective of tele-operation system 750, though other tele-operation systems with similar hardware could be used instead.

At 1402, input device 758 receives control selection input indicating a select control paradigm from a plurality of control paradigms. The control selection input can indicate the select control paradigm from the plurality of control paradigms based on at least one property selected from a group consisting of: a task to be performed by the robot; a description of a human operator of the tele-operation system; and a description of the select control paradigm. Examples of control selection input are described in detail above with reference to FIGS. 9-11, and are applicable to method 1400.

At 1404, the at least one processing unit 752 selects the select control paradigm from the plurality of control paradigms based on the received control selection input. Examples of selecting a select control paradigm based on control selection input are also described in detail above with reference to FIGS. 9, 10A, 10B, and 11, and are applicable to method 1400.

At 1406, an indication of the select control paradigm is sent by communication interface 756 or 708, to be received by at least one robot (e.g. robot 700). This is so the robot 700 can access the select control paradigm. In some implementations, the plurality of control paradigms are stored on non-transitory processor-readable storage medium 704 of robot 700. In such implementations, an indication of the select control paradigm, such as an identification number or storage address, is sent to robot 700. In other implementations, the plurality of control paradigms are stored on non-transitory processor-readable medium 754. In such implementations, sending the indication of the select control paradigm can include sending a digital copy of and/or data corresponding to the select control paradigm itself to robot 700. In yet other implementations, non-transitory processor-readable storage medium 754 is remote from the other components of tele-operation system 750, and sending the indication of the select control paradigm can include access information (e.g., storage location, IP address, security clearance information, or other pertinent information) so that robot 700 can retrieve a digital copy of and/or data corresponding to the select control paradigm from non-transitory processor-readable storage medium 754.

At 1408, the at least one input device 758 receives feedback input on at least one candidate action to be performed by the at least one robot based on the select control paradigm. In some implementations, act 1408 can be performed prior to robot 700 performing a candidate action (as is discussed in detail later with reference to FIG. 15). In other implementations, act 1408 can be performed after robot 700 performs a candidate action (as is discussed in detail later with reference to FIG. 16).

At 1410, the at least one processing unit 752 determines at least one update to the select control paradigm based on the feedback input. Detailed means for receiving feedback input and updating the select control paradigm are discussed later with reference to FIGS. 15 and 16.

At 1412, the at least one processing unit 752 provides instructions to store an updated control paradigm for subsequent access based on the at least one update. For example, the at least one processing unit 752 can produce an updated control paradigm, by modifying the select control paradigm with the determined at least one update, and provide this updated control paradigm for storage, such as in non-transitory processor-readable storage medium 704 or 754. As another example, the at least one processing unit 752 can produce an update instruction, which when provided to another processing unit causes the another processing unit to update the select control paradigm based on the update instruction. This is useful for example if the select control paradigm is stored remotely from the at least one processing unit 752, such as when the select control paradigm is stored on non-transitory processor-readable medium 704, or when non-transitory processor-readable storage medium 754 is remote from the other components of tele-operation system 750. In some examples the updated control paradigm can replace the select control paradigm in storage. In other examples the updated control paradigm can be stored in addition to the select control paradigm, so that either the updated or non-updated control paradigm can be accessed in the future.

In some implementations, non-transitory processor-readable storage medium 754 of tele-operation system 750 can have instructions stored thereon which, when executed by the at least on processing unit 752, cause tele-operation system 750 to perform method 1400 as illustrated in FIG. 14. For acts which involve causing tele-operation system 750 to receive input or data, such as acts 1402 and 1408, when implemented as instructions such instructions can cause the tele-operation system 750 to monitor for an input signal, detect an input signal, and/or process a detected input signal. This applies to similar acts of receiving input throughout this disclosure.

Figure 15:
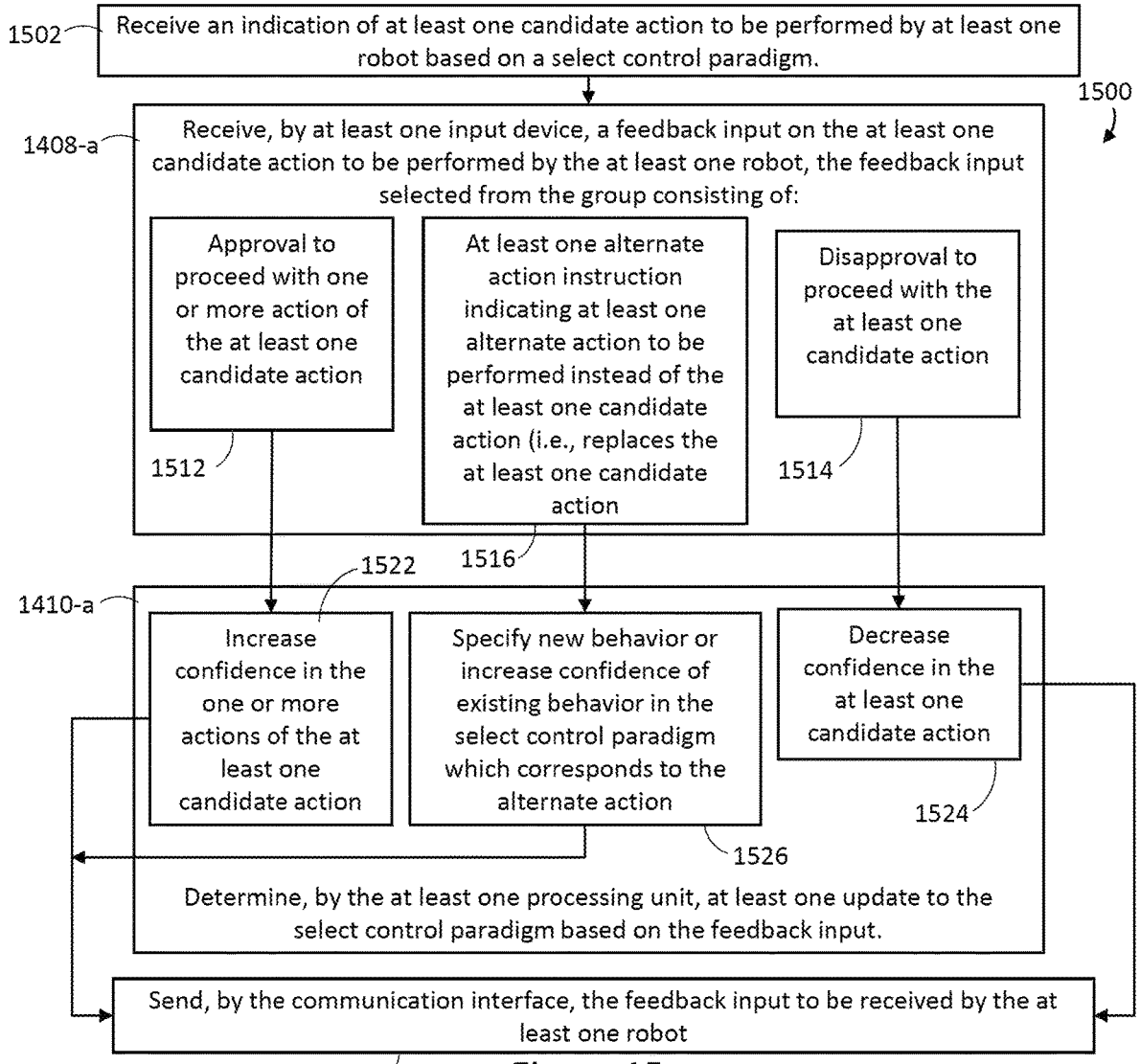
FIG. 15 is a flowchart diagram which illustrates a method for a tele-operation system receiving input on at least one candidate action to be performed by a robot, in accordance with one exemplary implementation.

FIG. 15 is a flowchart diagram of a method 1500. Method 1500 fits within method 1400 described above with reference to FIG. 14, with FIG. 15 providing additional context and detail regarding an exemplary implementation of acts 1408 and 1410 in method 1400. Additional acts 1502, 1504, 1522, 1524, and 1526 are described in method 1500. Further, different feedback inputs are labelled as 1512, 1514, 1516. Additional acts could be added, acts could be reordered, or acts could be removed, as appropriate for a given application. In essence, FIG. 15 depicts an implementation where an operator of a tele-operation system provides feedback input on at least one candidate action prior to a robot performing the at least one candidate action. FIG. 15 illustrates acts from a perspective of a tele-operation system (such as tele-operation system 750 in FIG. 7). A similar method described from the perspective of a robot is described above with reference to FIG. 12. The acts of method 1500 are described below with reference to robot 700 and tele-operator system 750 as illustrated in FIG. 7, though other robots or tele-operator systems with similar hardware could also be used.

In act 1502, tele-operation system 750 receives an indication of at least one candidate action to be performed by at least one robot 700 based on a select control paradigm. For example, communication interface 756 or 708 of tele-operation system 750 can receive a signal or signals from robot 700, which are indicative of at least one candidate action to be performed by robot 700 before the action is performed.

Act 1408-*a* in method 1500 shows a specific implementation of act 1408 shown in FIG. 14. In act 1408-*a*, the tele-operation system 750 receives, by at least one input device 758, a feedback input from an operator on the at least one candidate action. The feedback input comprises at least one instruction selected from a group consisting of: approval to proceed with one or more actions of the at least one candidate action (shown at 1512); disapproval to proceed with the at least one candidate action (shown at 1514); and at least one alternate action instruction indicating an alternate action to be performed instead of the at least one candidate action (shown at 1516). In the case of an alternate action instruction, the at least one candidate action can be replaced with the alternate action, such that subsequently performing the at least one candidate action comprises performing the alternate action.

Act 1410-*a* in method 1500 shows a specific implementation of act 1410 shown in FIG. 14. In act 1410-*a*, the at least one processing unit 752 of the tele-operator system 750 determines at least one update to the select control paradigm based on the feedback input. At 1522, the at least one processor 752 increases confidence in the one or more of the at least one candidate action if the feedback input indicates approval at 1512. At 1524, the at least one processor 752 decreases confidence in the at least one candidate action if the feedback input indicates disapproval at 1514. At 1526, the at least one processor 752 specifies new behavior or increases the confidence of existing behavior in the select control paradigm which corresponds to the alternate action at 1516. Similar to as discussed regarding FIG. 12, increasing or decreasing "confidence" refers to altering the control paradigm (e.g. adjusting coefficients in a neural network or similar; changing weights for certain actions in the control paradigm) to change how the control paradigm will respond when faced with the same or similar situation in the future. Increasing confidence will increase the likelihood that the same at least one candidate action is determined, whereas decreasing confidence will reduce the likelihood that the same at least one candidate action is determined. In the case of specifying new behavior, the control paradigm can be modified to include a new possible at least one candidate action as a response.

In act 1504, the feedback input is sent to the robot 700 by the communication interface 756 or 708. This is performed when the feedback input indicates approval (as shown by the flowchart arrows from 1512, to 1522, to 1504), when the feedback input indicates an alternate action (as shown by the flowchart arrows from 1516, to 1526, to 1504), or when the feedback input indicates disapproval (as shown by the flowchart arrows from 1514, to 1524, to 1504). If the feedback input indicates an approval or an alternate action, the robot 700 may perform the appropriate action. If the feedback input indicates disapproval, with no indication of alternate action, the processing unit 702 of the robot 700 can determine a new at least one candidate action, and an indication of the new at least one candidate action is sent to the tele-operation system 750, to be received as in act 1502. That is, if the feedback input indicates disapproval with no alternate action, method 1500 can be repeated without performing an action. In view of the update to the control paradigm in act 1410-*a*, the at least one processing unit 702 of the robot 700 should determine a different at least one candidate action (even if this takes multiple iterations) which will be approved by an operator (or until an operator provides an alternate action instruction).

Figure 16:
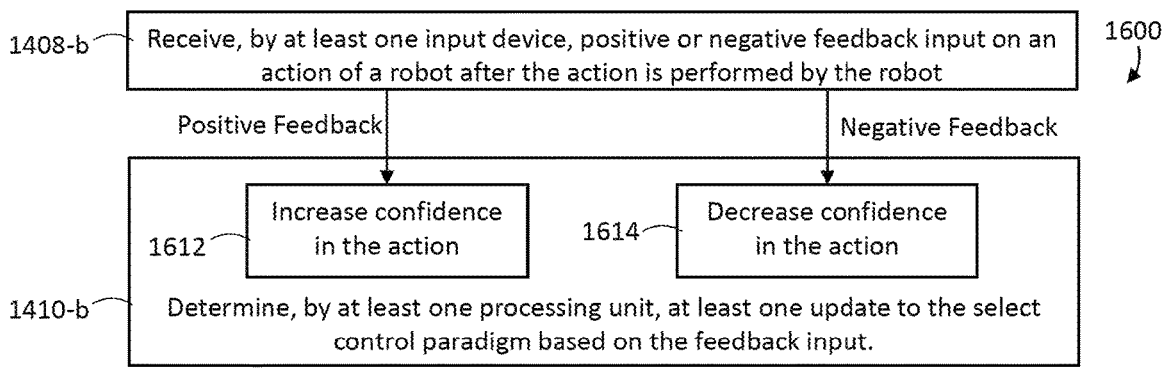
FIG. 16 is a flowchart diagram which illustrates a method for a tele-operation system receiving input on an action performed by a robot, in accordance with one exemplary implementation.

FIG. 16 is a flowchart diagram of a method 1600. Method 1600 fits within method 1400 described above with reference to FIG. 14, with FIG. 16 providing additional context and detail regarding an exemplary implementation of acts 1408 and 1410 in method 1400. Additional acts 1612 and 1614 are described in method 1600. Additional acts could be added, acts could be reordered, or acts could be removed, as appropriate for a given application. In essence, FIG. 16 depicts an implementation where a tele-operation system receives input on an action performed by a robot, to update a control paradigm for the future. FIG. 16 illustrates acts from a perspective of the tele-operation system. A similar method described from the perspective of a robot is described above with reference to FIG. 13. The acts of method 1600 are described below with reference to robot 700 and tele-operator system 750 as illustrated in FIG. 7, though other robots or tele-operator systems with similar hardware could also be used.

Act 1408-*b* in method 1600 shows a specific implementation of act 1408 shown in FIG. 14. In act 1408-*b*, at least one input device 758 of tele-operation system 750 receives positive or negative feedback input from an operator on an action of a robot 700 after the robot 700 performs the action. As discussed above regarding FIG. 13, "positive" feedback input means an operator approves of the actuation. Alternative terms for positive could include: approving, affirmative, or reinforcing, as examples. "Negative" feedback input means an operator disapproves of the actuation. Alternative terms for negative could include: disapproving, dissenting, disagreeing, or critical, as examples. For example, an operator of the teleoperation system can provide input by the at least one input device 758. The input can be binary, where "positive" input affirms that the action performed by the robot was correct, whereas "negative" input indicates that the action performed by the robot was incorrect. In some implementations, an operator can provide "negative" input indicating an alternate action that should have been performed instead (and thus at least implicitly indicating the performed action by the robot was incorrect).

Act 1410-*b* in method 1600 shows a specific implementation of act 1410 shown in FIG. 14. In act 1410-*b*, at least one processing unit 752 of the tele-operation system 750 determines at least one update to the select control paradigm based on the feedback input. In act 1612, where the feedback input was positive, the at least one processor 752 determines an update which increases confidence in the performed action. In act 1614, where the feedback input was negative, the at least one processor 752 determines an update which decreases confidence in the performed action. In cases where an operator provides feedback input indicating an alternate action, the at least one processor 752 can determine an update which increases confidence in the alternate action, or specifies new behavior in the select control paradigm directed to the alternate action.

In some implementations, a non-transitory processor-readable storage medium 754 of tele-operation system 750 can have instructions stored thereon which, when executed by at least one processing unit 752 of the tele-operation system 750, cause the tele-operation system 750 to perform method 1500 as detailed in FIG. 15 or method 1600 as detailed in FIG. 16. For acts which involve causing tele-operation system 750 to receive input or data, such as acts 1502, 1408-*a*, or 1408-*b*, when implemented as instructions such instructions can cause the tele-operation system 750 to monitor for an input signal, detect an input signal, and/or process a detected input signal. This applies to similar acts of receiving input throughout this disclosure.

The various implementations described herein may be combined with any or all of the systems, devices, and methods described in U.S. Provisional Patent Application Ser. No. 63/151,044, filed Feb. 18, 2021 and entitled "Systems, Devices, and Methods for Multi-Purpose Robots" (now U.S. Non-Provisional patent application Ser. No. 17/566,589), U.S. Provisional Patent Application Ser. No. 63/173,670, filed Apr. 12, 2021 and entitled "SYSTEMS, DEVICES, AND METHODS FOR DEVELOPING ROBOT AUTONOMY" (now U.S. Non-Provisional patent application Ser. No. 17/719,110), U.S. Provisional Patent Application Ser. No. 63/191,732, U.S. Provisional Patent Application Ser. No. 63/253,591, U.S. Provisional Patent Application Ser. No. 63/316,693, and/or U.S. Provisional Patent Application Ser. No. 63/332,750, all of which are incorporated herein by reference in their entirety.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "processing unit" (or alternately, a "processor") is a device which can execute instructions, logic, or programs, to perform various acts or manipulations of data. A processing unit can for example be implemented as application-specific integrated circuit(s) (i.e., ASICs), field-programmable gate arrays (FPGAs), programmable logic devices (PLDs), logic circuits, or any other appropriate hardware which can receive and process (act on or manipulate) data.

Throughout this specification and the appended claims, a "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A robot comprising:
   a body;
   at least one physically actuatable component mechanically coupled to the body;
   at least one processing unit;
   a communication interface communicatively coupled to a tele-operation system;
   at least one non-transitory processor-readable storage medium communicatively coupled to the at least one processing unit, the at least one non-transitory processor-readable storage medium storing data for a plurality of subsets of candidate operators of the tele-operation system, wherein each candidate operator in each respective subset of candidate operators is defined according to a respective role, the at least one non-transitory processor-readable storage medium further storing processor-executable instructions that, when executed by the at least one processing unit, cause the robot to:
   receive, by the communication interface, control selection input indicating a description of a role of an operator of the tele-operation system;
   determine, based on the description of the role of the operator, to which subset of candidate operators the operator belongs;
   select and access a select control paradigm based on the control selection input, the select control paradigm specific to the tasks expected to be performed by the robot based at least in part on the subset of candidate operators to which the operator is determined to belong, wherein each control paradigm in the plurality of control paradigms is trained based on use and feedback input by at least one operator in a respective subset of candidate operators;
   determine at least one candidate action of the at least one actuatable component based on the select control paradigm;
   actuate one or more of the at least one actuatable component in accordance with one or more of the at least one candidate action;
   receive feedback input on one or more of the at least one candidate action from the tele-operation system;
   update the select control paradigm based on the feedback input to produce an updated control paradigm;
   receive, by the communication interface, control selection input indicating a description of a role of an additional operator of the tele-operation system;
   determine, based on the description of the role of the additional operator, that the additional operator belongs to a same subset of candidate operators as the operator; and
   select and access the updated control paradigm.

2. The robot of claim 1, wherein the instructions which cause the robot to access the select control paradigm cause the processing unit to retrieve the select control paradigm from the non-transitory processor-readable storage medium.

3. The robot of claim 1, wherein the instructions which cause the robot to access the select control paradigm cause the robot to retrieve, by the communication interface, the select control paradigm from the tele-operation system.

4. The robot of claim 1, wherein:
   the instructions further cause the robot to output, by the communication interface, an indication of the at least one candidate action, wherein reception of feedback input occurs before actuation of at least one actuatable component; and
   the instructions which cause the robot to receive feedback input cause the robot to receive, from the tele-operation system, at least one instruction selected from a group consisting of: approval to proceed with at least one candidate action; disapproval to proceed with the at least one candidate action; and at least one alternate action instruction indicating an alternate action to be performed instead of the at least one candidate action.

5. The robot of claim 4, wherein the instructions which cause the robot to update, by the at least processing unit, the select control paradigm based on the feedback input cause the at least one processing unit to:
increase confidence in the at least one candidate action if the feedback input indicates approval;
decrease confidence in the at least one candidate action if the feedback input indicates disapproval; or
specify new behavior or increase the confidence of existing behavior in the select control paradigm which corresponds to the alternate action provided by the tele-operation system.

6. The robot of claim 1, wherein:
reception of feedback input occurs after causing actuation of the at least one actuatable component in accordance with a candidate action;
the instructions which cause the robot to receive feedback input cause the robot to receive, from the tele-operation system by the communication interface, positive or negative feedback input on the actuation; and
the instructions which cause the robot to update, by the at least one processing unit, the select control paradigm based on the feedback input cause the robot to: increase confidence in the candidate action if the feedback input is positive; or decrease confidence in the candidate action if the feedback input is negative.

7. The robot of claim 1, wherein the instructions further cause the robot to provide for storage the updated control paradigm for subsequent access.

8. The robot of claim 1 wherein the instructions further cause the robot to store the updated control paradigm in the non-transitory processor-readable storage medium.

9. The robot of claim 1, wherein the instructions further cause the robot to transmit, by the communication interface, the updated control paradigm to the tele-operation system.

10. The robot of claim 1, further comprising a plurality of sensors communicatively coupled to the at least one processing unit, wherein the instructions further cause the robot to:
collect, by the plurality of sensors, environmental data from an environment of the robot; and
transmit, by the communication interface, the environmental data to be received by the tele-operation system.

11. The robot of claim 1 wherein each role is characterized by a respective set of tasks.

12. A robot comprising:
a body;
at least one physically actuatable component mechanically coupled to the body;
at least one processing unit;
a communication interface communicatively coupled to a tele-operation system;
at least one non-transitory processor-readable storage medium communicatively coupled to the at least one processing unit, the at least one non-transitory processor-readable storage medium storing data for a plurality of subsets of candidate operators of the tele-operation system, wherein each candidate operator in each respective subset of candidate operators is defined according to a respective role, the at least one non-transitory processor-readable storage medium further storing processor-executable instructions that, when executed by the at least one processing unit, cause the robot to:
receive, by the communication interface, control selection input indicating a description of a role of an operator of the tele-operation system;
determine, based on the description of the role of the operator, to which subset of candidate operators the operator belongs;
select and access a select control paradigm based on the control selection input, the select control paradigm specific to the tasks expected to be performed by the robot based at least in part on the subset of candidate operators to which the operator is determined to belong, wherein each control paradigm in the plurality of control paradigms is trained based on use and feedback input by at least one operator in a respective subset of candidate operators;
determine at least one candidate action of the at least one actuatable component based on the select control paradigm;
actuate one or more of the at least one actuatable component in accordance with one or more of the at least one candidate action;
receive feedback input on one or more of the at least one candidate action from the tele-operation system;
update the select control paradigm based on the feedback input to produce an updated control paradigm;
receive, by the communication interface, control selection input indicating a description of a role of an additional operator of the tele-operation system;
determine, based on the description of the role of the additional operator, that the additional operator belongs to a different subset of candidate operators from the operator; and
select and access a select control paradigm that is different from the updated control paradigm.

13. The robot of claim 12, wherein the instructions which cause the robot to access the select control paradigm cause the processing unit to retrieve the select control paradigm from the non-transitory processor-readable storage medium.

14. The robot of claim 12, wherein the instructions which cause the robot to access the select control paradigm cause the robot to retrieve, by the communication interface, the select control paradigm from the tele-operation system.

15. The robot of claim 12, wherein:
the instructions further cause the robot to output, by the communication interface, an indication of the at least one candidate action, wherein reception of feedback input occurs before actuation of at least one actuatable component; and
the instructions which cause the robot to receive feedback input cause the robot to receive, from the tele-operation system, at least one instruction selected from a group consisting of: approval to proceed with at least one candidate action; disapproval to proceed with the at least one candidate action; and at least one alternate action instruction indicating an alternate action to be performed instead of the at least one candidate action.

16. The robot of claim 12, wherein the instructions which cause the robot to update, by the at least processing unit, the select control paradigm based on the feedback input cause the at least one processing unit to:
increase confidence in the at least one candidate action if the feedback input indicates approval;
decrease confidence in the at least one candidate action if the feedback input indicates disapproval; or specify new behavior or increase the confidence of existing behavior in the select control paradigm which corresponds to the alternate action provided by the tele-operation system.

17. The robot of claim 12, wherein:
reception of feedback input occurs after causing actuation of the at least one actuatable component in accordance with a candidate action;
the instructions which cause the robot to receive feedback input cause the robot to receive, from the tele-operation system by the communication interface, positive or negative feedback input on the actuation; and
the instructions which cause the robot to update, by the at least one processing unit, the select control paradigm based on the feedback input cause the robot to: increase confidence in the candidate action if the feedback input is positive; or decrease confidence in the candidate action if the feedback input is negative.

18. The robot of claim 12 wherein the instructions further cause the robot to store the updated control paradigm in the non-transitory processor-readable storage medium.

19. The robot of claim 12, wherein the instructions further cause the robot to transmit, by the communication interface, the updated control paradigm to the tele-operation system.

20. The robot of claim 12, further comprising a plurality of sensors communicatively coupled to the at least one processing unit, wherein the instructions further cause the robot to:
collect, by the plurality of sensors, environmental data from an environment of the robot; and
transmit, by the communication interface, the environmental data to be received by the tele-operation system.

\* \* \* \* \*